United States Patent [19]

Dong

[11] Patent Number: 5,754,582
[45] Date of Patent: May 19, 1998

[54] LASER LEVEL

[75] Inventor: Dawei Dong, Fremont, Calif.

[73] Assignee: Momentum Laser, Inc., Santa Clara, Calif.

[21] Appl. No.: 806,102

[22] Filed: Feb. 25, 1997

Related U.S. Application Data

[63] Continuation of Ser. No. 503,987, Jul. 19, 1995, abandoned, which is a continuation-in-part of Ser. No. 415,960, Apr. 3, 1995, abandoned.

[51] Int. Cl.$^6$ ..................................... H01S 3/08
[52] U.S. Cl. .................. 372/107; 372/108; 372/9; 372/92
[58] Field of Search .................. 372/107, 108, 372/9, 92

[56] References Cited

U.S. PATENT DOCUMENTS

| | | | |
|---|---|---|---|
| 4,723,841 | 2/1988 | Roy et al. | 350/359 |
| 4,916,713 | 4/1990 | Gerber | 372/107 |
| 4,973,158 | 11/1990 | Marsh | 356/247 |
| 5,084,883 | 1/1992 | Khalid et al. | 372/24 |
| 5,193,099 | 3/1993 | Chou | 372/107 |
| 5,272,707 | 12/1993 | Orlando | 372/9 |
| 5,283,802 | 2/1994 | Hsiung | 372/107 |
| 5,287,365 | 2/1994 | Nielsen et al. | 372/9 |
| 5,307,368 | 4/1994 | Hamar | 372/107 |
| 5,394,430 | 2/1995 | Huang | 372/107 |
| 5,448,587 | 9/1995 | Huang | 372/107 |

OTHER PUBLICATIONS

Advertisement for Laser Chalkline in JLC's *Tools of the Trade*, Fall 1995 Issue. p. 11.

Article on Rotating Laser Levels in JLC's *Tools of the Trade*, Fall 1995 Issue. pp. 49–53.

*Primary Examiner*—Leon Scott, Jr.
*Attorney, Agent, or Firm*—Wilson Sonsini Goodrich & Rosati; Robert Moll

[57] ABSTRACT

The present invention relates to laser leveling device suitable for construction. The present invention uses a standard low cost laser diode module as the laser source and optical system. A novel method is provided to align the non-collimated beam emitted from the standard low cost laser diode module so that it is perpendicular to the rotational axis of the laser level. The present invention describes a laser level which can be operated in four different modes: dot mode, line mode, oscillation mode and plane mode. Dot mode provides two level laser dots. Line mode provides a short bright level line. Oscillation mode provides a long bright reference line. Plane mode provides a level 360 degree reference plane. The invention also provides a structure which allows two vertical reference planes which are perpendicular to each other and perpendicular to the horizontal reference plane to be generated.

23 Claims, 20 Drawing Sheets

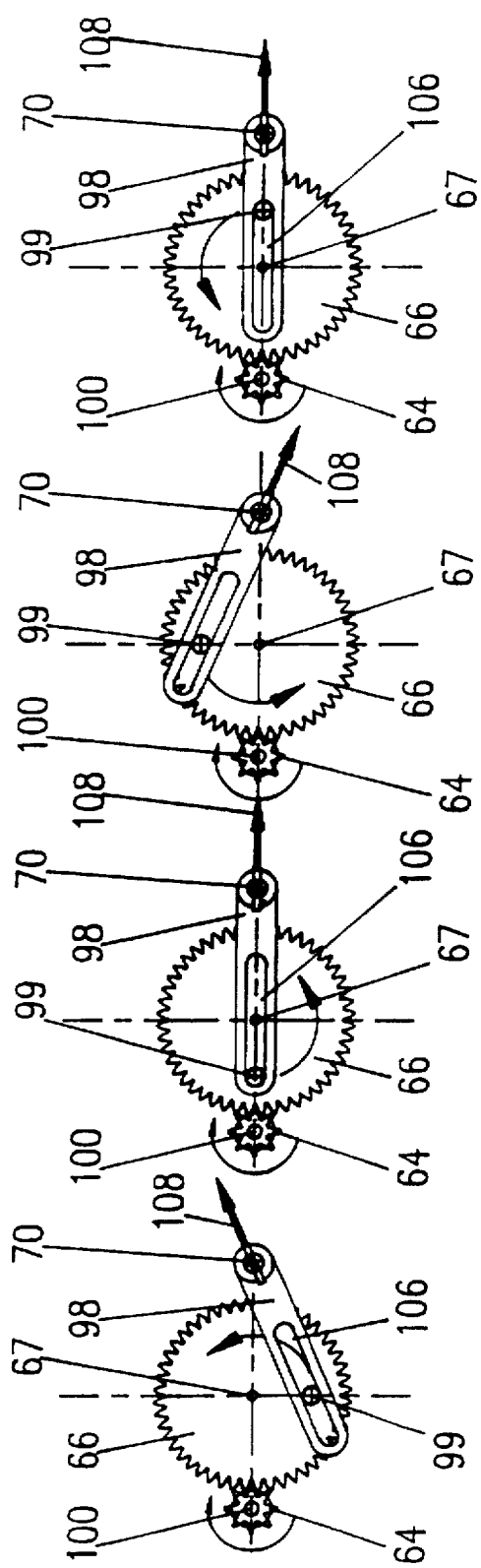

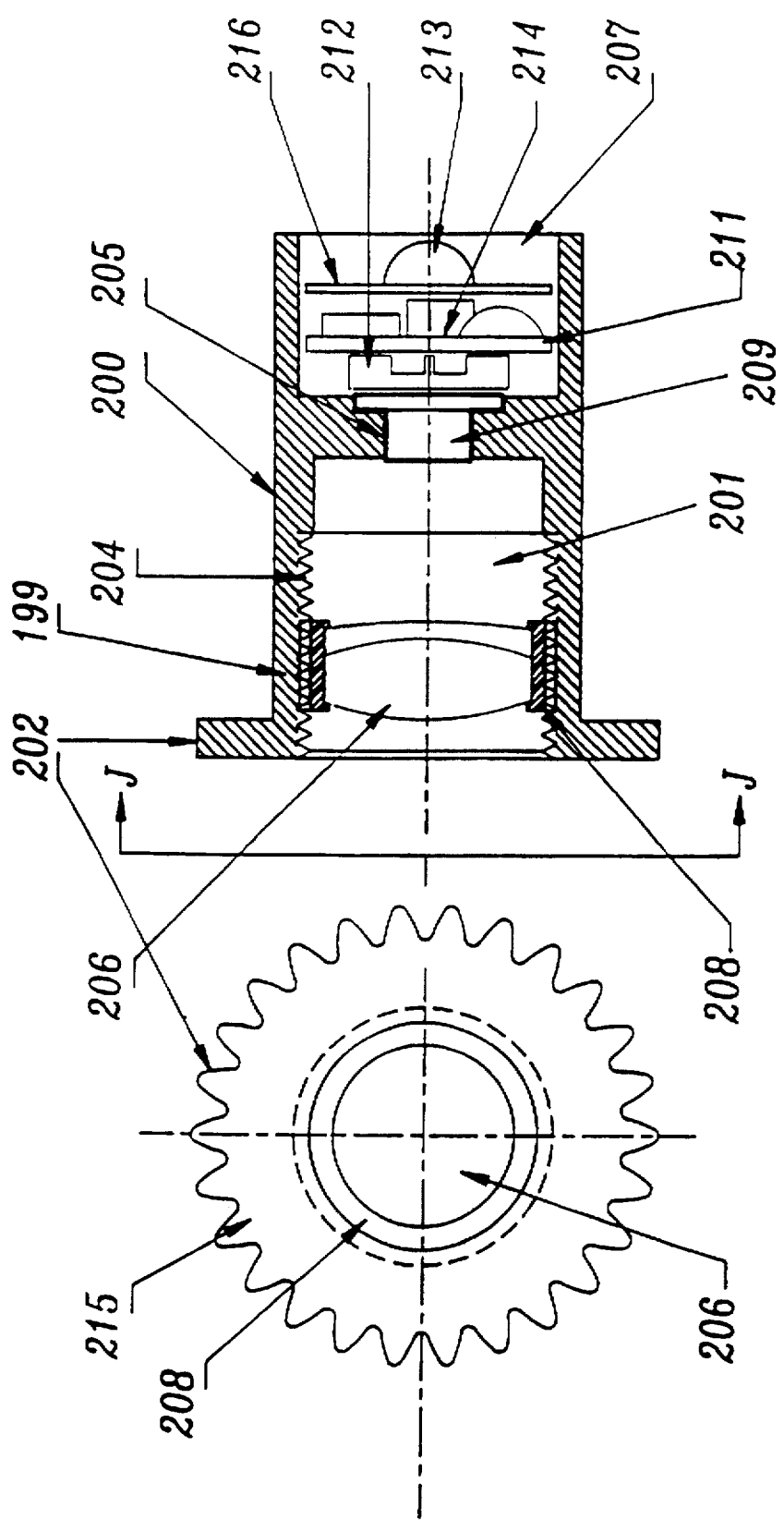

LASER LEVEL

The present application is a continuation of U.S. application Ser. No. 08/503,987 filed on Jul. 19, 1995, now abandoned, which is a continuation-in-part of U.S. application Ser. No. 08/415,960, filed on Apr. 3, 1995, now abandoned.

BACKGROUND OF INVENTION

The present invention relates generally to leveling instruments, and more particularly, relates to a laser leveling instrument capable of multiple modes of operation. The present invention is related to Disclosure Document No. 366475, entitled, Laser Level, filed on Dec. 8, 1994.

Laser levels have been used in construction for many years. They typically seek to produce a plane of light for a reference for construction projects. Laser levels have been used for large scale construction projects like commercial excavating, laying foundations, and installing drop ceilings. Laser levels save considerable time during initial layout of a construction job compared to other tools such as beam levels, chalk lines, or torpedo levels. Some examples of jobs where laser levels would be useful include laying tile, mounting cabinets, installing counter tops, and building outdoor decks. Because these laser levels can typically cost thousands of dollars, only those who regularly land larger construction projects can justify purchasing a laser level. Laser levels have not achieved widespread adoption by the general public despite the time savings because of their initial cost of ownership. The expense can be attributed to the cost of suitable laser sources such as He-Neon laser and associated optical system used to manipulate the beam generated by the laser source.

SUMMARY OF INVENTION

The present invention relates to a laser level instrument. In one embodiment, the present invention employs a laser diode module as the laser source and optical system. The present invention can generate a level plane of light or a level line of light which can be a layout reference. Instead of defining an optical path by using expensive optical components and complex alignment procedures to manipulate the laser beam, the invention is capable of using relatively inexpensive optical components and novel alignment procedures to permit use of laser diode modules. In another feature, the invention provides a novel method where the existing laser beam output from a low cost laser diode module can be aligned to be perpendicular to the rotational axis of the laser level instrument. The method can dramatically decrease the cost of the necessary optical system used in the laser level. Thus the cost barrier which prevents the public from adopting the laser level as a general purpose tool is greatly reduced.

In a feature of the present invention, a method is provided to align the laser beam output from a laser module so that it is perpendicular to the main shaft. In one method, the low cost laser diode module is installed in a laser module housing which is attached to a main shaft. The main shaft defines a rotational axis of the laser level and is mounted in the top surface of an outer casing. The top of the outer casing is machined so that it is flat. When mounted, the main shaft is perpendicular to the top surface of the outer casing and the laser beam is parallel to the top surface of the outer casing. Inside the outer casing, in one embodiment, the main shaft is installed in an oil-less bearing coupled by a pulley to the shaft of a motor whose rotational axis is parallel with the main shaft. The motor causes the laser module housing to rotate. A spirit level can be used as a reference to level the top surface of the outer casing. Once the top surface of the outer casing is level, the rotating laser beam is capable of generating a level reference plane of light. The outer casing is mounted on an adjustable base plate. The outer casing can be mounted on the base plate in a number of orthogonal orientations to generate, for example, horizontal, vertical, and plumb reference planes of light.

It is an object of the present invention to provide a means to oscillate the module housing. This creates a reference line of light which is significantly more visible than the forementioned reference plane. The reference line of light is rotatable around the rotational axis of the laser level. The reference line of light is rotatable both manually and automatically via remote control.

It is another object of the present invention to provide a means to install a plurality of laser diode modules into the module housing. When the laser module housing is rotated or oscillated, then a respective reference plane or reference line generated will be significantly more visible compared with a laser module housing which has just a single laser diode module installed. When the module housing is not rotating or oscillating, the user may project a plurality of laser light dots on any flat target. The user may then draw a level line by connecting the laser dots on the target surface.

It is another object of the present invention to provide a means to simultaneously generate a perpendicular cross-hair reference line of light relative to the reference plane of light. The perpendicular reference line of light is produced by an accessory to the laser level. The accessory consists of two mirrors positioned to reflect a portion of the reference plane of light. The first mirror reflects a portion of the reference plane ninety degrees into the second mirror. The second mirror reflects the laser beam another ninety degrees and generates a perpendicular cross hair reference relative to the original reference plane of light. The cross hair reference can be generated anywhere along the original reference plane of light by rotating the accessory around the laser levels rotational axis.

BRIEF DESCRIPTION OF DRAWINGS

FIGS. 14A–D illustrates the oscillation movement of the laser level.

FIG. 15A is a cross-sectional view of another embodiment of the laser diode module.

FIG. 15B is a view of the laser diode module taken along line J—J.

DETAILED DESCRIPTION OF THE PREFERRED EMBODIMENTS

A laser level includes a laser beam that is rotated around a rotational axis. The optical system is extremely important to a laser level because the optical system is what manipulates the laser beam so that it can be aligned precisely perpendicular to the rotational axis of the laser level. It is important that the laser beam can be therefore aligned to be exactly perpendicular to the rotational axis. A properly aligned laser beam will create a level plane of the same height from a reference no matter how far or how close the target surface is from the laser level. When a laser beam is not aligned to be perpendicular to the rotational axis, it will create a reference line which varies in height depending on how far or how close the target is away from the laser level instrument.

Figure 1:
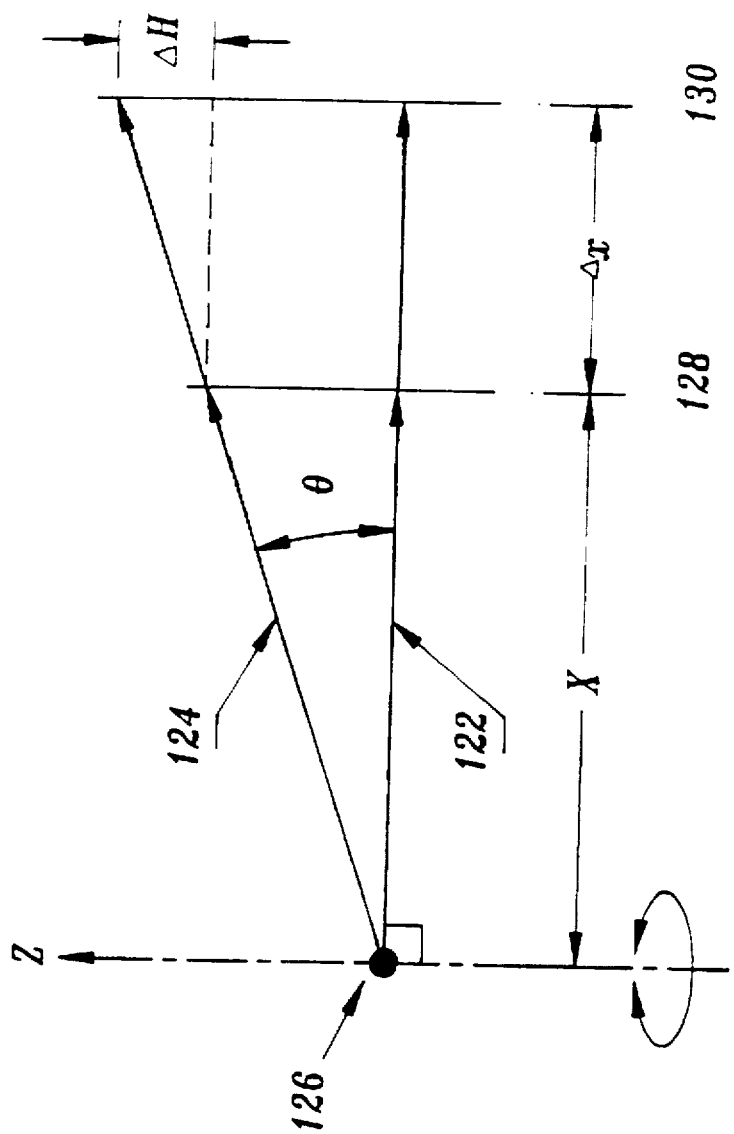
FIG. 1 is a diagram showing the effect of an inaccurate beam alignment.

FIG. 1 illustrates a properly aligned laser beam 122 and an improperly aligned laser beam 124. Beam 122 is perpendicular to the Z-axis of rotation. Beam 122 is projected on two vertical targets: target 128 and target 130. Target 128 is some distance "x" from the laser source 126. Target 130 is an additional distance "delta x" away from target 128. The difference in vertical height between the point where the beam 122 hits target 128 and the point where the beam 122 hits target 130 is zero. Beam 124 is not perpendicular to the rotational axis Z. Beam 124 is some angle theta away from the perpendicular. Beam 124 is projected on the same targets 128 and 130. The difference in height between the point where beam 124 will hit target 128 and the point where the beam 124 will hit the target 130 will be different by some distance "delta H". This will create significant problems. For example, if a laser level is located at the center of a square room and the beam is aligned like beam 124, the laser level will be incapable of drawing a correct level reference line on the four walls. This will typically make the laser level unusable for many applications.

Figure 2:
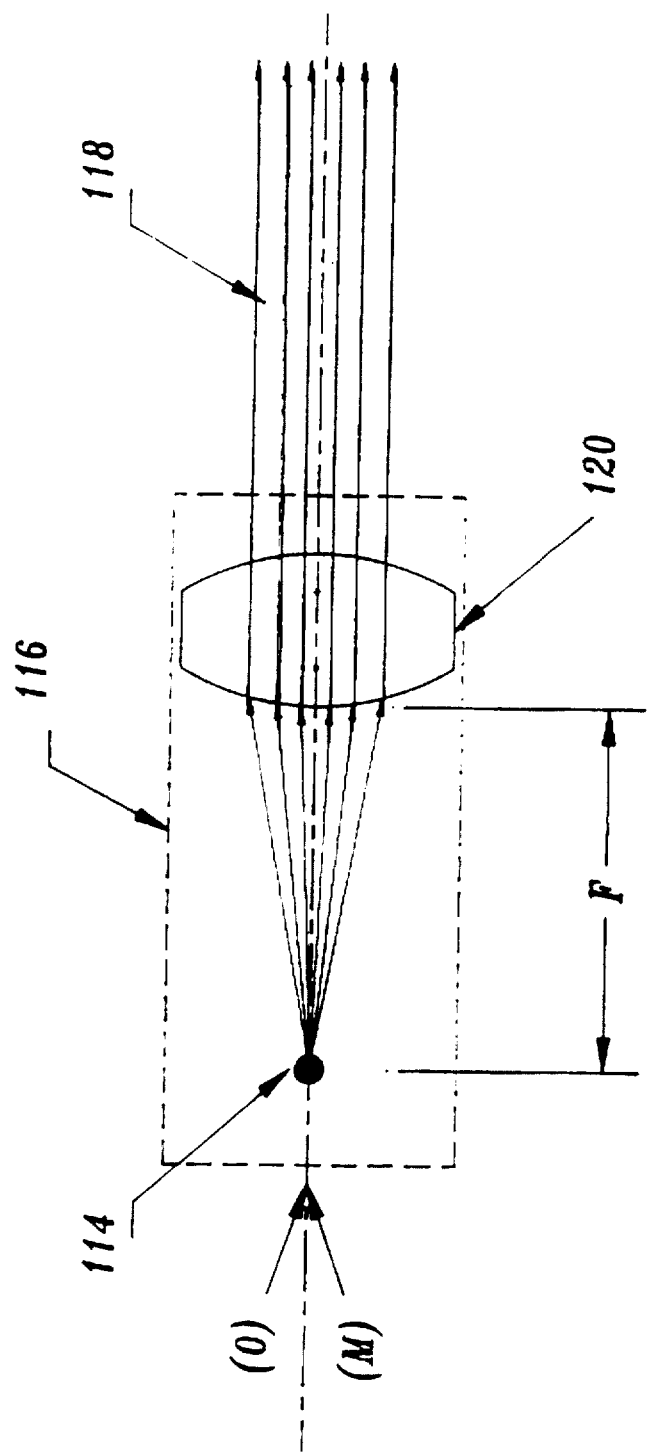
FIG. 2 is a diagram of a simple collimating optical system.

One attempt to properly align the laser beam with respect to the rotational axis Z involves use of relatively expensive optical components and time consuming alignment procedures. FIG. 2 is a schematic of such a representative system. The optical axis O is the central axis of the lens 120. The mechanical axis M is the central axis of the outer housing 116 encasing the laser diode source 114 and the associated lens 120. From a practical perspective, it is the mechanical axis M which must be aligned perpendicular to the rotational axis Z and the beam 118 should be collimated with respect to the mechanical axis M. However, a meticulous alignment process is required to produce the collimated beam 118. The optical axis O of the lens 120 needs to be aligned with the mechanical axis M of the housing 116. The laser diode source 114 must be then aligned on the optical axis O. In short, the laser diode source 114 and the lens 120 must be aligned so they are concentric with respect to each other. Third, the laser diode source 114 must be one focal length F from the lens 120 along the optical axis O. The lens 120 required in such a collimating system is relatively expensive because it needs to be relatively free of lens defects such as spherical aberrations, coma, and astigmatism.

A suitable collimating laser diode module is part no. 06DLL645 made by Melles Griot Inc. of Boulder, Colo.

In order to make an affordable laser level the cost of the optical system including the lens must be reduced and the cost of aligning the optical system must be lowered. The present invention achieves this cost reduction by a method to adapt a standard low cost, non-precision optical system so that it is usable in a precision laser level instrument.

In one embodiment, the present invention employs a low cost laser diode module such as that used in laser pointers. These laser diode modules include a laser diode source and an optical system integrated in an outer housing. The optical components are inexpensive and the alignment process is quick and simple. A standard low cost laser diode module consists of a laser diode source, a printed circuit board for mounting the source, an inexpensive converging lens and an outer housing. One suitable laser diode module is the VLM-670 available from Quarton Company of Taipei, Taiwan.

Figure 3:
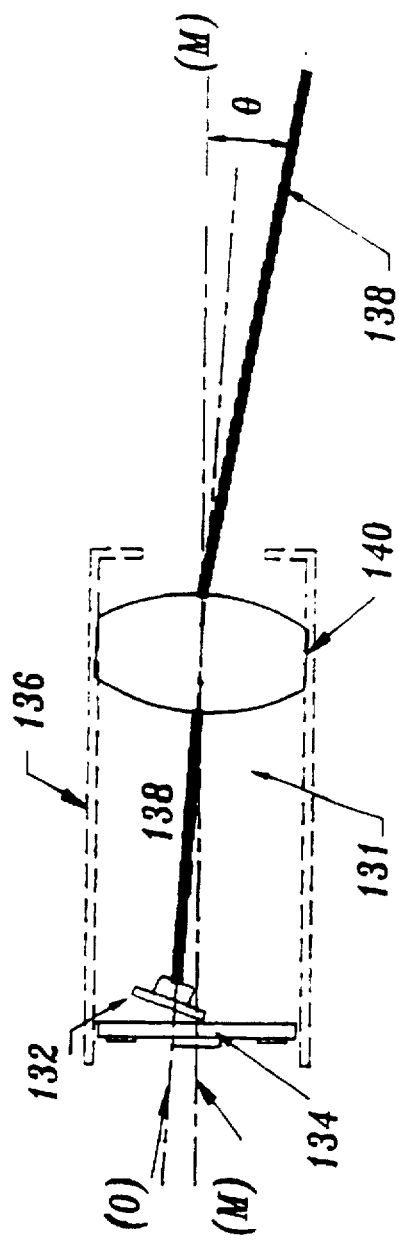
FIG. 3 is an illustration of typical alignment tolerances found in standard low cost laser diode modules.

FIG. 3 illustrates the alignment tolerances found in a typical low cost standard laser diode module 131. In a typical manufacturing process for these laser diode modules, the laser diode 132 is glued to the printed circuit board 134. The printed circuit board 134 with the laser diode 132 is installed into the outer housing 136 along with the lens 140. The lens 140 and laser diode 132 are then adjusted so that the beam 138 focuses on a target (not shown), for example, 5–10 meters away from the laser diode 132. Little attention is paid to placing the laser diode 132 one focal length from the lens or aligning the laser diode 132 so that it is concentric to the lens 140. The mechanical axis M and the optical axis O are typically not aligned. The beam 138 is typically not collimated relative to the mechanical axis M.

Figure 4:
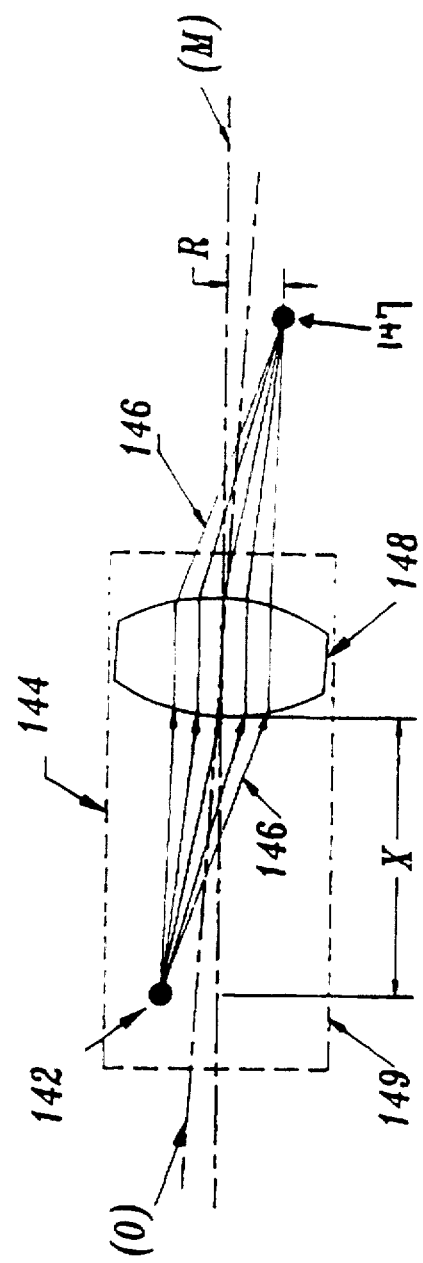
FIG. 4 is a diagram of a typical laser beam path found in standard low cost laser diode module.

FIG. 4 shows a typical laser beam 146 found in a standard low cost laser diode module 149. Instead of collimating with respect to mechanical axis M the beam 146 will likely converge on a spot 147 some radial distance R from the mechanical axis M.

Figure 5:
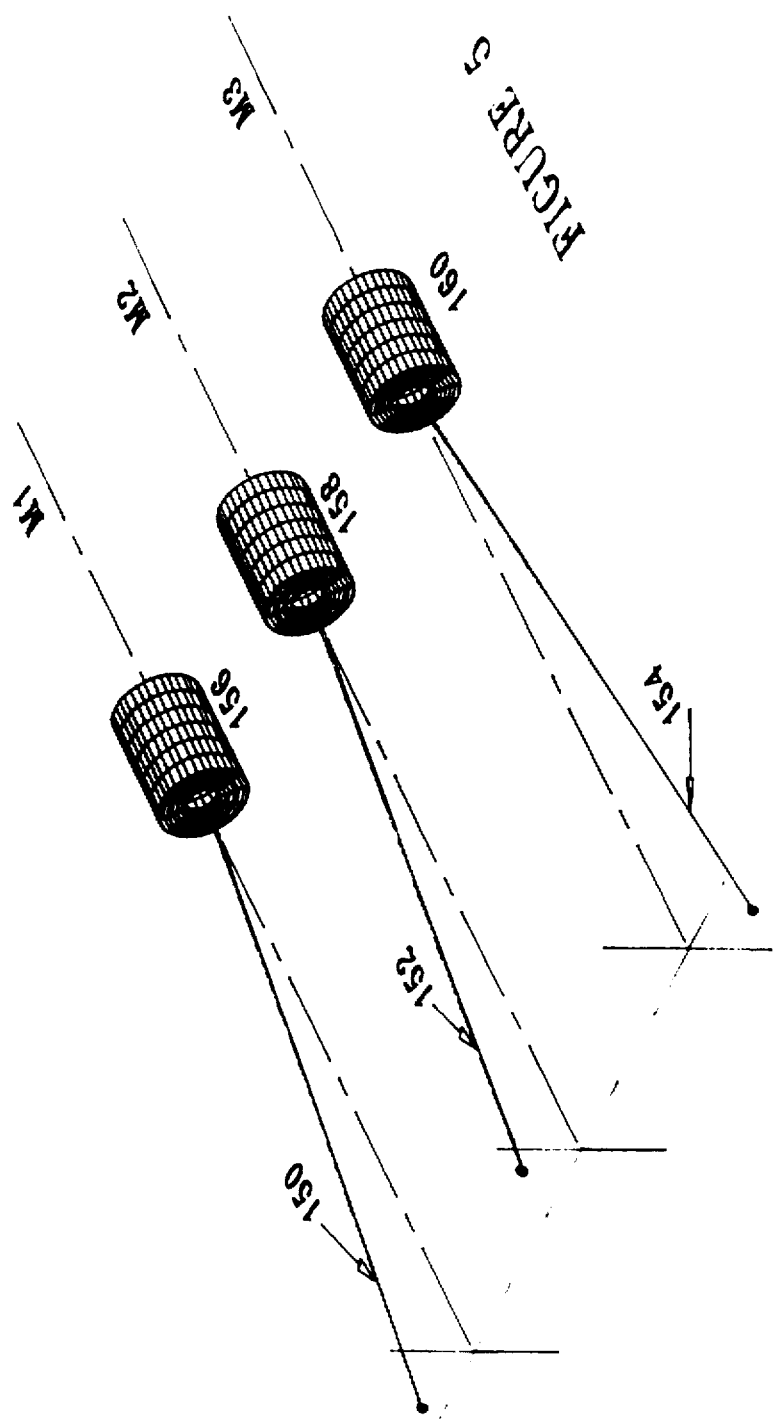
FIG. 5 is an illustration of random laser beam paths emitted from a standard low cost laser diode module.

The optical system found in a standard low cost laser module is believed to be unusable in a typical laser level instrument application. Each laser diode module will produce a laser beam which will vary in some unpredictable angular relationship with respect to the mechanical axis M. FIG. 5 illustrates this relationship with three laser diode modules 156, 158, and 160 aligned on mechanical axes M1, M2, and M3 and emanating laser beams 150, 152, and 154.

Figure 6:
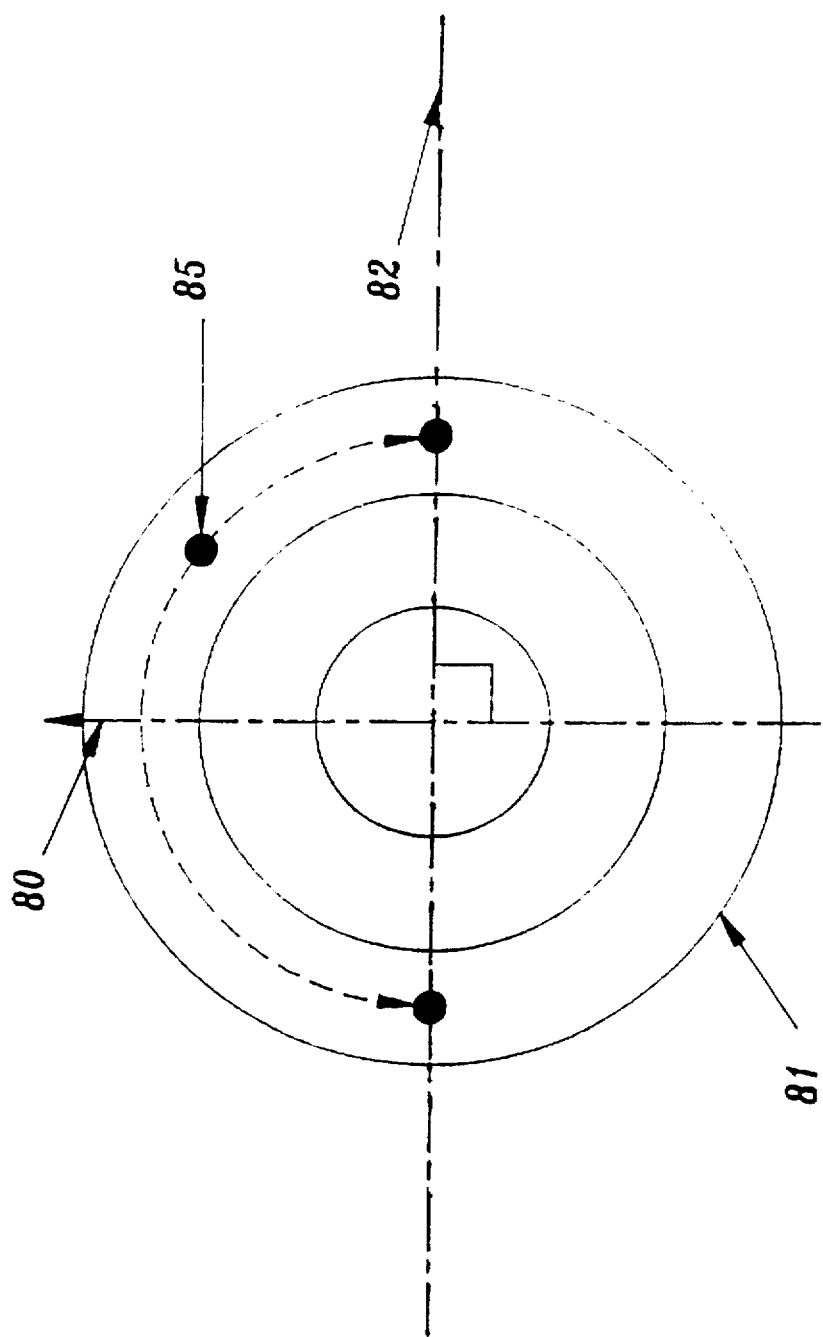
FIG. 6 is an illustration of the front view of an alignment target.
Figure 7:
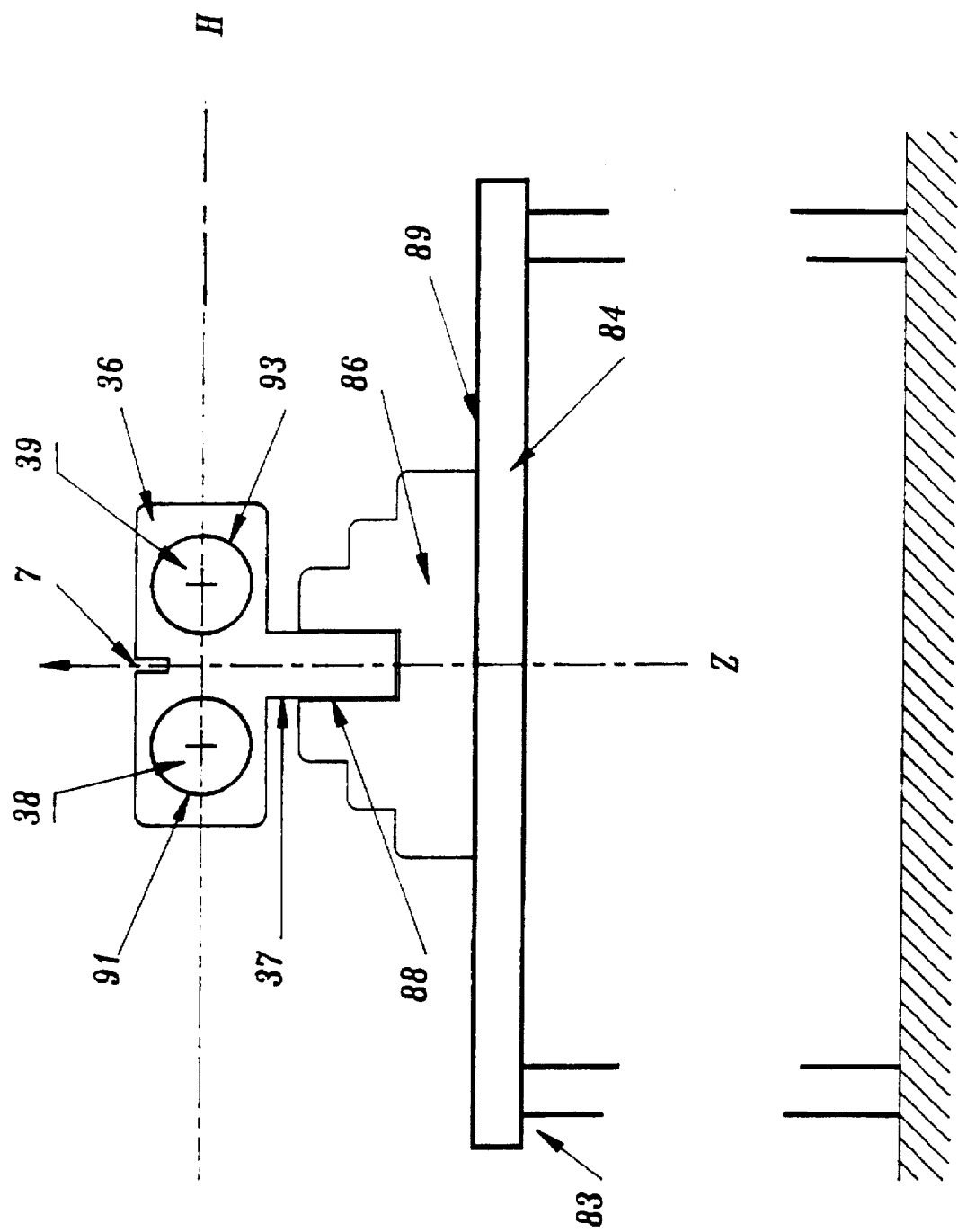
FIG. 7 illustrates a front view of an alignment station.

The present invention provides a method for aligning the beam emanating from a standard low cost laser diode so that it is perpendicular to the rotational axis of a laser level. In one embodiment, the method includes use of an alignment target 81 and an alignment station 83 as shown in FIGS. 6–7. In a preferred embodiment, the alignment target 81 is shown on a vertical wall in the plane of the sheet (FIG. 6). The alignment target 81 has a vertical reference line 80 and a horizontal reference line 82 which are perpendicular to each other. The vertical reference line 80 is assumed to be normal to the earth's surface. The size of the alignment target 81 is preferably 4 feet in diameter, though the exact size is not critical.

Referring to FIG. 7, a preferred embodiment of an alignment station 83 is shown. For example, in FIG. 7, the alignment station 83 includes a rigid table 84 with a flat upper surface 89 which can be adjusted to be level and parallel to the earth's surface and a rigid alignment fixture 86. The alignment fixture 86 is securely mounted on the table 84 and has a hole 88 which is perpendicular to the table 84. The module housing 36 includes a main cylindrical shaft 37 which extends into the hole 88 in a snug manner so that the shaft 37 is normal to the earth's surface. The main shaft 37 is hollow to permit passage of wire leads (not shown) to the laser diode modules 38 and 39. The module housing 36 and main shaft 37 are preferably machined out of single block of metal such as stainless steel. The main shaft 37 extends from the middle of the module housing 36 and defines a Z-axis of rotation. A slot 7 is machined in the center of the module housing 36 and is aligned with the Z-axis. The module housing 36 preferably includes two cylindrical holes 91 and 93 for mounting two laser diode modules 38 and 39. As shown, the Z-axis of rotation defined by the shaft 37 is perpendicular to the horizontal axis H which intersects with the center axis of the cylindrical holes 91 and 93.

The alignment target 81 and alignment station 83 are preferably at least about 15 meters from each other although the exact distance is not critical. The alignment station 83 and the alignment target 81 are aligned so that the horizontal reference line 82 of the alignment target 81 (FIG. 6) and the horizontal axis H of the module housing 36 are parallel to one another and in the same horizontal level plane with respect to the earth. One method to ensure the horizontal axis H and the horizontal line 82 are properly aligned is to use an auto-leveling laser level such as the 1142 XL Laser-Level manufactured by Spectra-Physics Corporation of Dayton, Ohio. The vertical reference line 80 of the target 81 will then be perpendicular to the table 84 of the alignment station 83 and parallel to the main shaft 37. The laser diode modules 38 and 39 are then inserted in the holes 91 and 93 in the module housing 36. The laser diode modules 38 and 39 fit snugly into the holes 91 and 93 of the module housing 36 but are still rotatable within the module housing 36. A laser diode module 38 is powered so that a laser beam strikes the target 81 (FIG. 6) and causes a laser beam spot 85 to appear on the target 81. The laser beam spot 85 is used as an illustration. The actual laser beam spot 85 emitted by any given laser diode module will be typically located randomly somewhere on the target 81. It should be noted before the laser diode module 38 is powered the exact location of the spot will not be predictable based on the orientation of the module 38 due to three factors: the non-centration between the laser source and the converging lens, the random distance between the laser source and the converging lens and the random alignment of the optical axis relative to the mechanical axis. As the laser diode module 38 is rotated inside the module housing 36 the laser beam spot 85 will rotate correspondingly. The laser diode module 38 is rotated until the laser beam spot 85 is centered along the horizontal reference line 82 of the target 81. At this point the position of the laser diode module 38 is fixed within the module housing 36 by a strong adhesive such as LocTite 640 made by LocTite of Cleveland, Ohio. In a preferred embodiment, two laser diode modules 38 and 39 will be rotated so the position of each laser beam dot generated by each laser diode module 38 and 39 will each be along the horizontal reference line 82. When both laser beam dots are adjusted in this manner both laser beams emitted from the laser diode modules 38 and 39 will be perpendicular to the main shaft 37.

Figure 8:
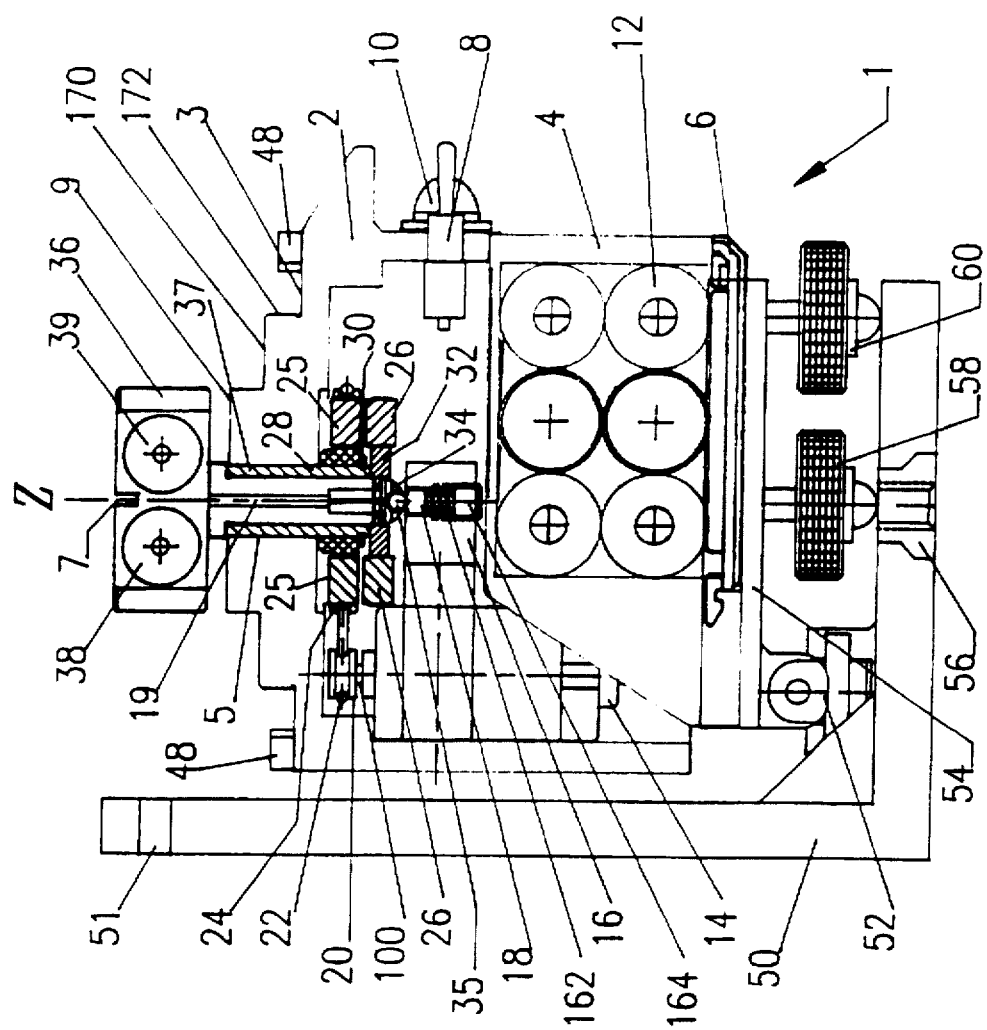
FIG. 8 illustrates a side cross-sectional view of a laser level without a cap.
Figure 11:
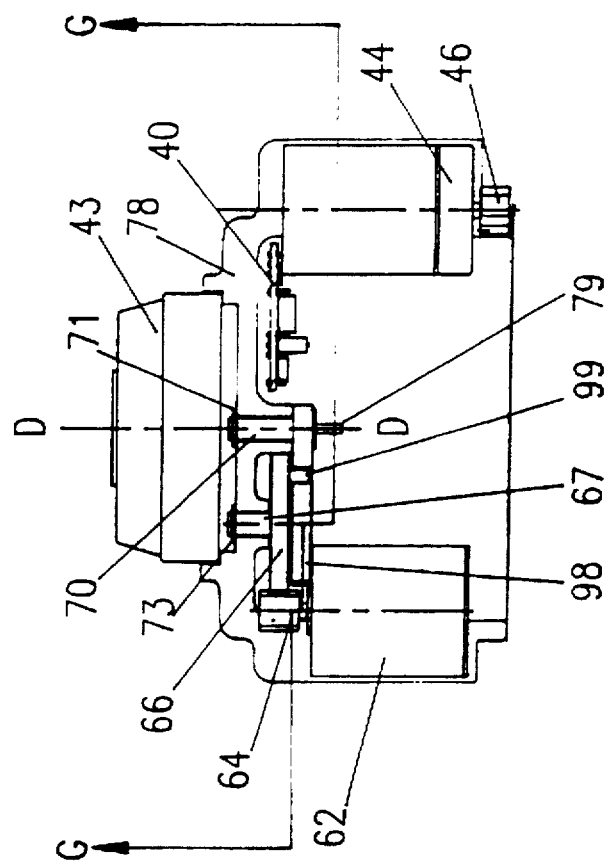
FIG. 11 illustrates a front cross-sectional view of another embodiment of a cap.
Figure 12:
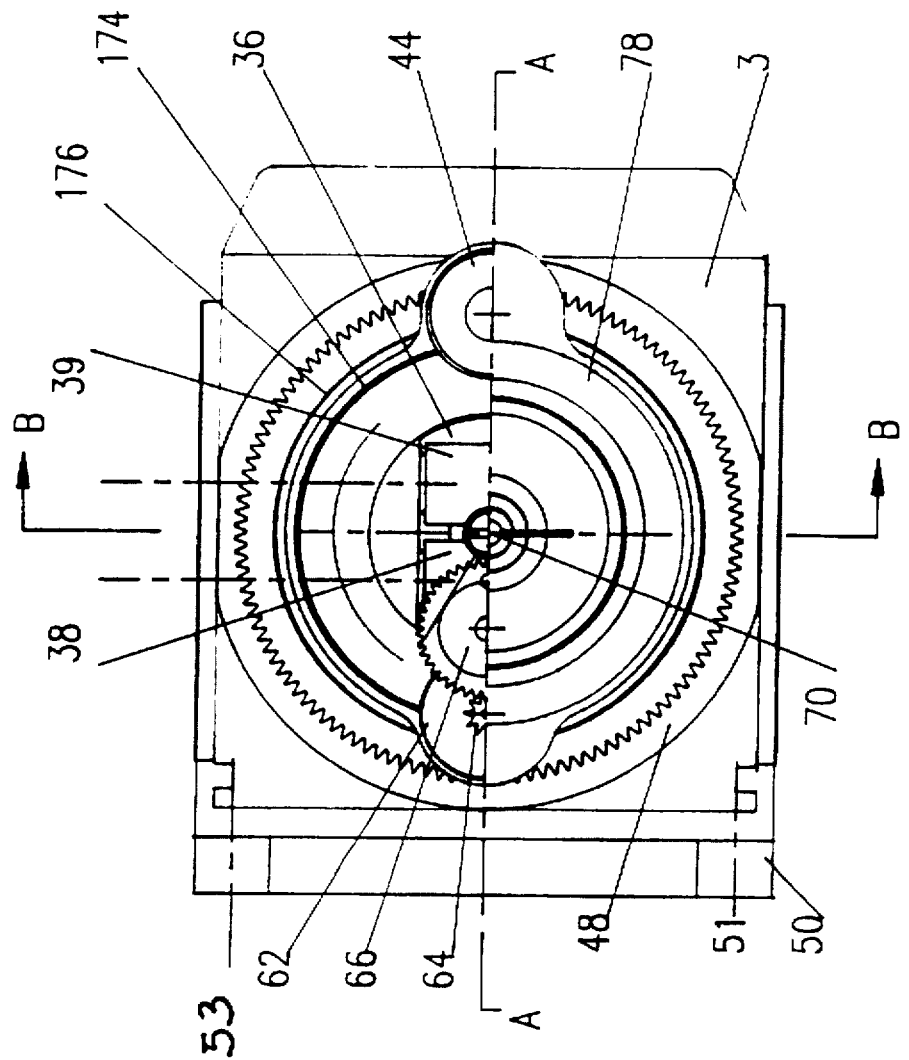
FIG. 12 illustrates a partial cut away view of the top of the laser level with a cap installed.

FIG. 8 illustrates a cross-sectional view of an embodiment of the laser level 1 not having a cap in place and taken along line A—A of FIG. 12. FIG. 8 shows the laser level 1 with four major components: an upper case 2, a lower case 4, a base plate 54, and a wall mount 50. The upper case 2 and the lower case 4 are both hollow in the middle. Each of the four major components should be made of a rigid material such as injection molded ABS plastic. The upper case 2 includes a flat upper surface 3 upon which rests a cap such as that shown in FIGS. 10–11. An alternative embodiment includes a flat upper surface 3 that is cast out of metal and rigidly attached to the upper case 2. A circular orifice 5 is bored into the top surface 9 of the upper case 2. The orifice 5 is perpendicular to the upper surface 3. An oil-less bearing 28 is pressed snugly into the orifice 5 so the bearing 28 is fixed with respect to the upper case 2. One suitable bearing is a bronze-oil impregnated bearing part no. B6-54 available from Motion Industries of Santa Clara, Calif. The module housing 36 contains laser diode modules 38 and 39 which are aligned with respect to the shaft 37 as described earlier. The module housing 36 also includes a main shaft 37 which is inserted into the oil-less bearing 28. One suitable material for the main shaft 37 is type 303 stainless steel. The outer surface of the main shaft 37 is machined and polished so that it is smooth. The resulting fit between the oil-less bearing 28 and the shaft 37 is snug, but the shaft 37 can be freely rotated inside the oil-less bearing 28. A retainer ring 30 is used to retain a main pulley 24 to the bottom of the oil-less bearing 28. One suitable retainer ring 30 is a ⅛ inch stainless steel retainer ring part no. Q2-37 available from Motion Industries of Santa Clara, Calif. A suitable main pulley 24 can be made from nylon.

The main pulley 24 is rotated around the oil-less bearing 28. The main pulley 24 secures a set of upper-magnets 25. A suitable set of magnets 25, for example, are the M35.500, ¼ inch diameter, ³/₁₆ inch thick magnets made by Edmund Scientific Company of Barrington, N.J. The main pulley 24 is coupled to a small pulley 20 by means of a pulley belt 22. A suitable pulley belt is the STS-70-226, ¹/₁₆ inch diameter "O" ring manufactured by Winfred M. Berg Inc. of East Rockaway, N.Y. A suitable small pulley 20 can be made of nylon. The small pulley 20 is fitted to the shaft 100 of a DC motor 14. A suitable DC motor is the 273—273, 65 mA, 1.5 v to 4.5 v DC motor with gear available from Radio Shack of Milpitas, Calif. A frame 16 (FIG. 9A) attaches the DC motor 14 to the interior wall of the upper casing 2 by the bolts 17 and 101. A suitable frame is molded out of the same injection molded ABS plastic used, for example, for the upper case 2. A free wheel 32 shown in FIG. 8 is rigidly attached to the main shaft 37 by a nylon screw 34. A suitable free wheel 32, for example, is fabricated out of nylon. A suitable nylon screw 34 is a ⁹/₃₂–½ inch nylon screw. The screw 34 is hollow in the center which permits passage of an electrical lead 19. The electrical lead 19 is soldered to a ball contact 35 which is supported by the head of the screw 34. The ball contact 35 is made of stainless steel and is polished to be smooth to ensure continuous smooth electrical contact with a brush contact 18.

The free wheel 32 holds a set of lower magnets 26. A suitable set of lower magnets 26 are the M35.500, ¼ inch diameter, 3/16 inch thick magnets made by Edmund Scientific Company of Barrington, N.J. The lower magnets 26 are substantially aligned with the set of upper magnets 25 in the main pulley 24. The polarity of the upper magnets 25 and lower magnets 26 are oriented such that they are attracted to one another. As the DC motor 14 rotates the small pulley 20 rotates the pulley belt 22 which drives the main pulley 24. The rotation of the main pulley 24 and the attractive force between the upper magnets 25 and the lower magnets 26 will cause the free wheel 32 to rotate which causes the main shaft 37 and the module housing 36 to rotate.

An alternative embodiment is to orient the magnets 25 and 26 so they repel one another.

As shown in FIG. 8, the ball contact 35 rests on top of the brush contact 18. The ball contact 35 is able to rotate freely relative to the brush contact 18. A suitable brush contact 18 can be fabricated out of stainless steel. A spring 162 supports the brush contact 18. A screw 164 supports the spring 162. In an alternative embodiment, the suitable brush contact 18 includes a bowl shaped round smooth upper plate (not shown) rather than a flat surface which makes continuous receiving contact with the ball contact 35. In either embodiment, electrical continuity exists between the brush contact 18 and the ball contact 35 to provide electrical power through the electrical leads 19 to the laser diode modules 38 and 39. Suitable laser diode modules 38 and 39 are part no. VLM-670 available from Quarton Company of Taipei, Taiwan. The screw 164 is preferably screwed into the frame 16. A wire (not shown) is used to connect the brush contact 18 with a positive terminal of a set of batteries 12. The ground path for the laser diode modules 38 and 39 is provided by the stainless steel outer casing of the laser diode modules 38 and 39. The ground path is established by conductance between the stainless steel main shaft 37, the stainless steel oil-less bearing 28, and a wire (not shown) connected to the negative terminal of the batteries 12.

A LED indicator 10 is mounted to the front of the upper case 2. A suitable LED is the part no. 276-025 available from Radio Shack of Milpitas, Calif. When the power is applied to the laser diode modules 38 and 39 the LED indicator 10 lights up. A switch 8 is also mounted to the front of the upper case 2. A suitable switch is the part no. 275-634 available from Radio Shack of Milpitas, Calif. The switch 8 applies power to the laser diode modules 38 and 39. A second switch (not shown) is used to apply power to the DC motor 14. The lower case 4 is attached to the upper case 2 by means of screws (not shown). The bottom surface of the lower case 4 is flat. When properly attached to the upper case 2, the bottom surface of the lower case 4 is parallel to the top surface 3 of the upper case 2. The lower case 4 contains the set of six batteries 12 used to power the laser level 1. A suitable battery for the set 18 a size "AA" alkaline battery. A removable bottom cover 6 for the lower case 4 is used to provide access to the batteries 12.

Figure 9:
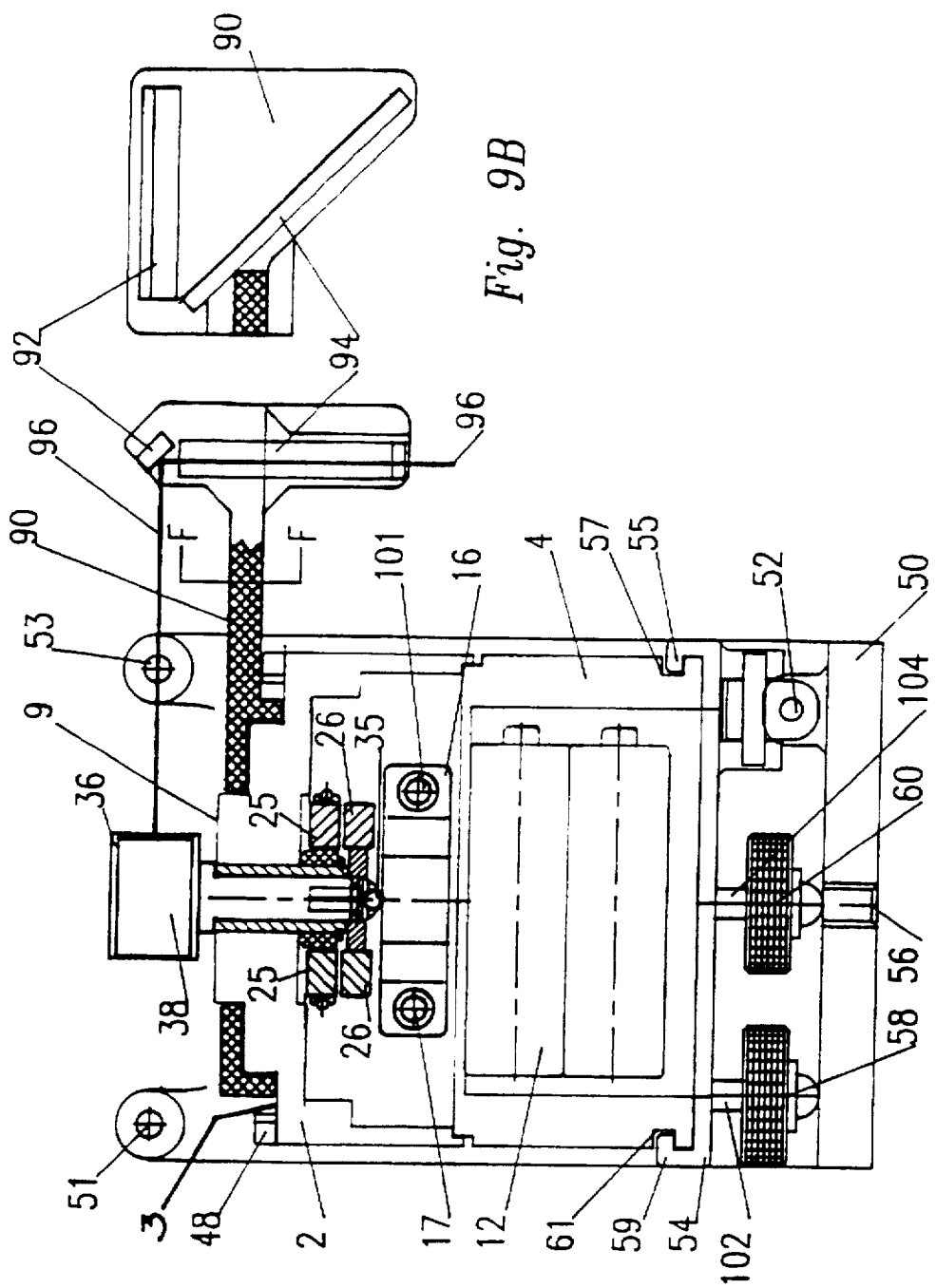
FIG. 9A illustrates a front cross-sectional view of the laser level with a cross hair accessory attached.
FIG. 9B illustrates the cross-hair accessory.

FIG. 9A illustrates a front cross-sectional view of the laser level 1 with a cross-hair accessory 90. The cross-section of the laser level 1 is taken along line B—B of FIG. 12. The base plate 54 has two rails 55, 59 machined so that they are parallel and level with respect to each other. The bottom of the lower case 4 has two lower slots 57, 61, which are machined to be parallel and level to one another and parallel to the upper surface 3 of the upper case 2. The lower case 4 is mounted on the base plate 54 by sliding the lower case 4 onto the base plate 54 using the lower slots 57 and 61 and the parallel rails 55 and 59 as guides. The bottom and top surfaces of the base plate 54 are machined to be flat. Two threaded posts 102 and 104 are attached to the base plate 54 by each using a retainer ring (not shown). The threaded post 102 is attached to the center of the outer left edge of the base plate 54. The threaded post 104 is attached to the center of the outer front edge of the base plate 54. Suitable threaded posts 102 and 104 can be fabricated out of stainless steel. The adjustable wheels 58, 60 are threaded respectively into the posts 102, 104 to adjust the level of the base plate 54. A suitable adjustable wheel is the part no. 9330 screw with knurled knobs available from Rutland Industries of San Jose, Calif. One end of the universal joint 52 is attached to preferably the bottom right part of the base plate 54. The opposite end of the universal joint 52 is attached to the wall mount 50 so that the base plate 54 is able to pivot around the universal joint 52 when the adjustable wheels 58, 60 are rotated for height adjustments. A suitable universal joint 52 is the spherical bearing RJS-4 available from Motion Industries of Santa Clara, Calif. A threaded hole 56 for conventional camera or construction tripod (not shown) is bored into the bottom surface of the wall mount 50 to allow for convenient mounting on a standard camera or construction tripod. Two chassis holes 51 and 53 are drilled into the side surface of the wall mount 50 so that the laser level 1 can be conveniently mounted to a flat surface. In a preferred embodiment, the centerline of the chassis holes 51, 53 define a line (not shown) within the plane where the laser level beam will be projected. For example, if the laser level 1 is used to define a horizontal line on a wall, the laser level 1 can be mounted on an opposite wall at the same height by lining the holes 51, 53 on that line.

As shown in FIG. 9A, the cross-hair accessory 90 fits on the upper surface 3 of the upper case 2. The accessory 90 has a first mirror 92 aligned at the height of the projected laser beam 96. The first mirror 92 is angled at 45 degrees and reflects the laser beam 96 into the second mirror 94. As shown in FIG. 9B, a front view of the cross-hair accessory 90 taken along the line F—F, the second mirror 94 is angled 45 degrees and reflects the laser beam 90 degrees. Suitable mirrors 92 and 94 are the M31.011 mirrors available from Edmund Scientific of Barrington, N.J. Consequently, a laser level 1 projecting a rotating horizontal laser beam 96 into the cross-hair accessory 90 will project a vertical line perpendicular with respect to the horizontal plane.

Figure 10:
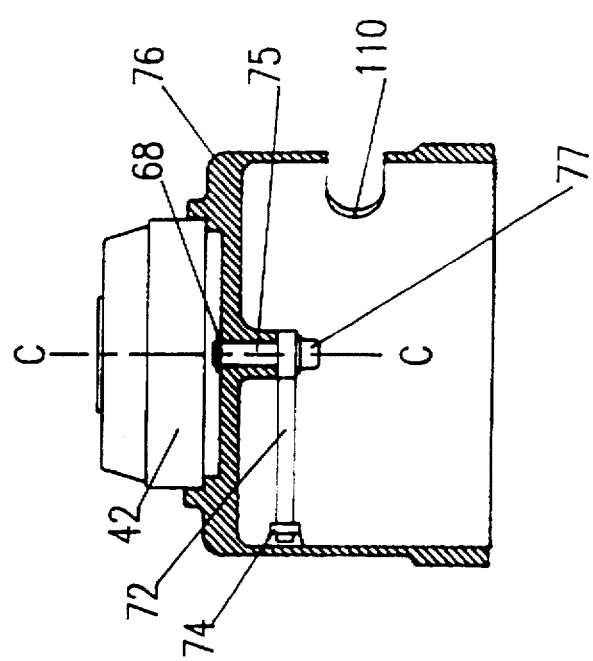
FIG. 10 illustrates a side cross-sectional view of an embodiment of a cap.

FIG. 10 illustrates a cross-sectional view of one embodiment of the cap 76 of the present invention. Cap 76 fits on the upper surface 3 of the upper case 2 (FIG. 8). Cap 76 is circular in shape. A suitable cap 76 can be fabricated out of type 6061 aluminum. When properly mounted on the upper surface 3, the C-axis shown in FIG. 10 will align with the Z-axis shown in FIG. 8. The inner wall of the cap 76 will fit snugly against an outer wall 172 of a middle stair 170. The cap 76 is rotatable around the middle stair 170. The middle stair 170 is preferably fabricated out of a rigid material such as that used for the upper surface 3. The top and bottom surfaces of cap 76 are flat and machined to be parallel to each other. A circular spirit level 42 is mounted flush with the top of the cap 76. A suitable spirit level 42 is the M42.763 available from Edmund Scientific Company of Barrington, N.J. Cap 76 is placed over the module housing 36 so that the bottom surface of the cap 76 is flush with the upper surface 3 of the upper case 2. A linear spring 72 is perpendicularly pressed into the side to the shaft 75. A suitable spring 72 can be fabricated from 0.03 inch thick spring steel. A suitable shaft can be fabricated out of stainless steel. The length of the linear spring 72 extends from the shaft 75 to near the inner wall of the cap 76 and overlaps with a spacing contact 74 rigidly attached to the inner wall of the cap 76. A suitable spacing contact 74 can be fabricated out of aluminum.

The present invention permits a number of different modes of operation using cap 76. The cap 76 shown in FIG. 10 is placed on the laser level 1 shown in FIG. 8. Using the spirit level 42 as a reference, the laser level 1 is correctly oriented with respect to earth by using the adjustable wheels 58 and 60. An alternative embodiment places a spirit level or a plurality of spirit levels on the upper surface 3 of the main case 2 shown in FIG. 8. After the laser level 1 has been leveled, the cap 76 is removed. The laser diode modules 38, 39 are then powered by toggling on an electrical switch 8. In the dot mode, two laser level beam dots appear on a flat target surface and can be used by an operator to draw a level reference line.

In the plane mode, a second switch (not shown) is toggled on and the DC motor 14 is activated. The DC motor 14 rotates the main pulley 24 and the upper magnets 25 as described earlier in connection with FIG. 8. Because the lower magnets 26 are attracted to the upper magnets 25, the freewheel 32 attached to the lower magnets 26 will rotate. Since the free wheel 32 is attached to the main shaft 37, the module housing 36 will also rotate. Since the beams emitted by the laser diode modules 38, 39 in the module housing 36 are aligned perpendicular to the main shaft 37, the laser level 1 will generate a level plane of reference light.

In the short line mode, if the cap 76 is placed on the laser level 1, the module housing 36 will be coupled to the shaft 75 by the shaft tip 77 (FIG. 10) extending into the slot 7 (FIG. 8) in the module housing 36. When the shaft tip 77 and the slot 7 are properly coupled, the laser diode modules 38 and 39 will emit out of a opening 110 of the cap 76. When the module housing 36 is rotated the linear spring 72 will be obstructed by the spacing contact 74. When this happens the entire module housing 36 will reverse the direction of rotation momentarily because the linear spring 72 creates enough force to separate the lower set of magnets 26 from the upper set of magnets 25. The module housing 36 will then change back to the original direction of rotation when the upper and lower magnets 25, 26, are aligned and rotating together. This ongoing reversal of rotational direction will cause a short, very bright reference line to be generated on a flat target surface. The laser level 1 used without the cap 76 will generate a 360 degree reference plane. With the cap 76, the laser level 1 will generate a short bright line which is useful in applications with brighter ambient light.

FIG. 11 illustrates a cross-sectional view of another embodiment of the present invention. This embodiment includes a cap 78 which fits on the upper surface 3 of the upper case 2. When properly mounted on the upper surface 3, the D-axis shown in FIG. 11 will align with the Z-axis shown in FIG. 8. The top and bottom surfaces of cap 78 are flat and machined to be parallel to each other. A circular spirit level 43 is mounted flush with the top of the cap 78. A suitable spirit level 43 is the M42,763 available from Edmund Scientific Company of Barrington, N.J. Cap 78 is placed over the module housing 36 so that the bottom surface of cap 78 is flush with the upper surface 3 of the upper case 2 (FIG. 8). A ruling shaft 70 is attached to the bottom of the cap 78 by means of a retainer ring 71. A suitable ruling shaft 70 can be fabricated out of stainless steel. The ruling shaft 70 is aligned along the D-axis. At the end of the ruling shaft 70 is a ruling shaft tip 79. When the cap 78 is properly fitted to the upper case 2, the ruling shaft tip 79 fits into the slot 7 (FIG. 8).

As shown in FIGS. 11 and 14A, a pivot arm 98 is attached to the ruling shaft 70. FIGS. 14A–D illustrate the oscillation mode of the laser level 1. FIG. 14A is a partial cross-sectional view taken along the line G—G of FIG. 11. The pivot arm 98 is preferably metal and cylindrical shaped. A groove 106 is machined into the pivot arm 98. The groove 106 is machined to snugly fit a round peg 99. The round peg 99 is attached near an outside edge of an eccentric wheel 66. A suitable eccentric wheel 66 and the peg 99 can be fabricated out of nylon. The outer edge of the eccentric wheel 66 includes gear teeth. The center of the eccentric wheel 66 with gear teeth is attached to a secondary shaft 67. The secondary shaft 67 is attached to top surface of the cap 78 by means of a retainer ring 73. A suitable secondary shaft 67 can be fabricated out of stainless steel.

As shown in FIG. 11, a motor 62 drives a gear assembly 64, for example, in the clockwise direction. The gear assembly 64 is coupled with the outer gear teeth of the eccentric wheel 66. A suitable motor 62 and gear assembly 64 is the DC motor with gear assembly part no. S-148 available from Futaba of Tokyo, Japan. FIGS. 14A–D illustrate how rotational movement by an eccentric wheel 66 converts into an oscillatory motion of a beam 108 projected by laser diode modules 38, 39. As the eccentric wheel 66 rotates in the counter-clockwise direction, the pivot arm 98 pivots about the ruling shaft 70. FIG. 14A illustrates the initial position of the pivot arm 98 relative to the ruling shaft 70. The peg 99 in the groove 106 is in the 3 o'clock position. As the eccentric wheel 66 rotates counter-clockwise 90° around the secondary shaft 67, the far end of pivot arm 98 moves to the left in response to movement of the peg 99 which has moved to the 12 o'clock position as shown in FIG. 14B. FIG. 14C shows the peg 99 in the 9 o'clock position after the wheel 66 rotates another 90° counter-clockwise. Finally, FIG. 14D shows the peg 99 in the 6 o'clock position after the wheel 66 rotates another 90° counter-clockwise. The corresponding oscillatory pendulum-like movement of the laser beam 108 is shown in FIGS. 14A–D.

FIG. 12 illustrates a partial cut-away top view of the cap 78 installed on the laser level 1. The upper half of the FIG. 12 above line A—A is cut away to show the mechanisms hidden beneath the cap 78. The outer gear teeth of the eccentric wheel 66 is coupled with the gear assembly 64 which is driven by a DC motor 62. As shown, the DC motor 62 is mounted on the left side of the cap 78. When the DC motor 62 is activated it will cause the pivot arm 98 to pivot about the ruling shaft 70 as discussed earlier.

When the cap 78 is properly fit on the top surface 3 of the upper case 2 the ruling shaft tip 79 (FIG. 11) will fit into the slot 7 (FIG. 8) and will oscillate the module housing 36. Another DC motor 44 is mounted on the right side of the cap 78. The shaft of the DC motor 44 is fitted with a gear 46 (FIG. 11). A suitable DC Motor 44 with gear 46 is part no. S-148 available form Futaba of Tokyo, Japan. When the cap 78 is placed on the upper surface 3 of the upper case 2, the gear 46 will mesh with an internal gear 48 (FIGS. 8 and 12). A suitable internal gear 48, for example is part no. SIE632-048A120 available from Designatronic, Inc. of New Hyde Park, N.Y. When the cap 78 is installed on the laser level 1 and the DC motor 44 is activated, the cap 78 rotates around the D-axis as shown in FIG. 11.

In another embodiment, the laser level 1 can be remotely activated by a printed circuit board (PCB) receiver 40 which is mounted into the cap 78. One suitable PCB receiver 40 is made by Ming Engineering Corporation of Los Angeles, Calif., which will receive an RF signal preferably 30 MHz sent by a compatible transmitter (not shown) also made by Ming Engineering Corporation. The signal is decoded by the receiver 40 and the DC motor 44 is activated via a conventional small relay (not shown).

In still another alternative embodiment of the cap 78, the PCB receiver 40 and the DC motor 44 with gear 46 may be eliminated. In this case, the operator can rotate the cap 78 manually.

As shown in FIG. 12, power is provided to the cap 78 via a metal voltage ring 176 and a metal ground ring 174 which are attached to the upper surface 3. Two leads (not shown) attach the voltage ring 176 and the ground ring 174 to the batteries 12 shown in FIG. 8. Another pair of leads (not shown) are attached to the bottom surface of the cap 78 and provides power for the DC motors 62 and 44 shown in FIG. 11.

Cap 78 shown in FIG. 11 is placed on the laser level 1 shown in FIG. 8. The ruling shaft tip 79 will extend into the slot 7 shown in FIG. 8. Thus, the ruling shaft 70 will be coupled with the module housing 36 and the laser diode modules 38 and 39 (FIG. 8) will emit out of an opening (not shown) in the cap 78. Using the spirit level 43 as a reference, the laser level 1 is leveled using the adjustable wheels 58 and 60. After the laser level 1 has been leveled, the laser diode modules 38, 39 are powered by toggling on electrical switch 8. A second switch (not shown) is toggled on and the DC motor 62 is activated. This causes the eccentric wheel 66 to oscillate the ruling shaft 70 back and forth as described in connection with FIGS. 14A–D. Since the ruling shaft 70 is housing 36 the module housing 36 the module housing 36 will also oscillate back and forth as described earlier. With the laser diode modules 38, 39 activated, this oscillation will produce a long reference line on a flat target surface. By manually rotating the cap 78 the long reference line can be rotated 360 degrees around the Z-axis shown in FIG. 8. An automated means of rotating cap 78 is provided by activating the second DC motor 44. The small gear 46 will rotate against the internal gear 48 fixed to the upper surface 3 of the laser level 1 causing the cap 78 to rotate. The second DC motor 44 can be also activated by remote control by a PCB receiver/transmitter as discussed above.

Figure 13B:
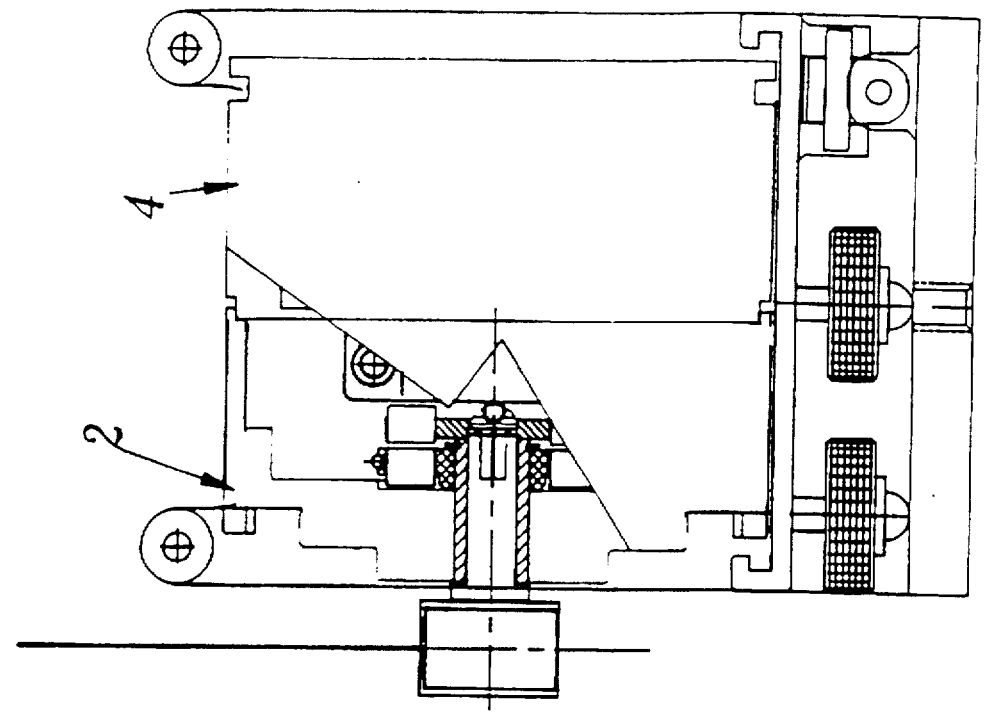
FIG. 13B illustrates a partial cut away view of another possible orthogonal orientation of a case.
Figure 13A:
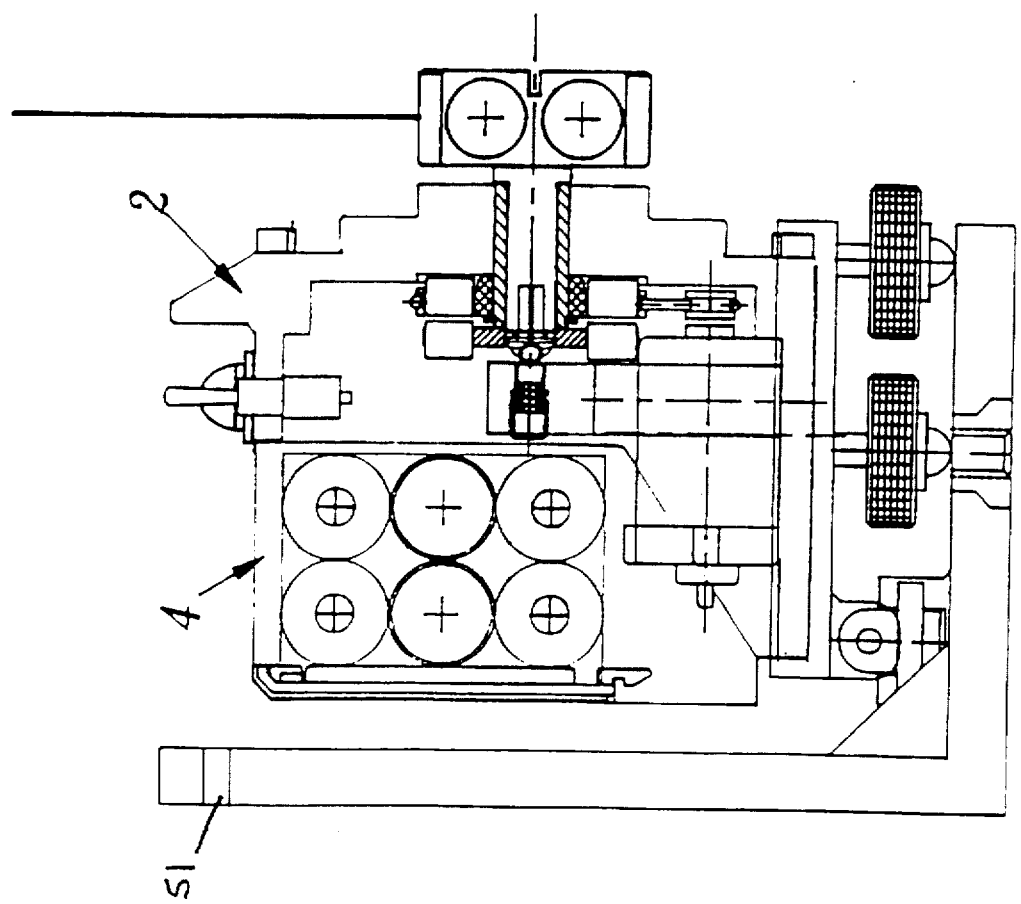
FIG. 13A illustrates a cross sectional view of a possible orthogonal orientation of a case.

FIGS. 13A and 13B illustrate two orthogonal orientations of the laser level 1. All sides of the upper case 2 and the lower case 4 are flat and perpendicular to the upper surface 3. The base plate 54 is machined to be flat. The upper case 2 and the lower case 4 can be placed in the orientations shown in FIGS. 13A and 13B. This allows the operator to draw two reference planes in addition to the horizontal plane. For example, the laser level 1 can provide for a vertical reference plane that is perpendicular to the horizontal reference plane and a plumb reference plane that is perpendicular to both the vertical reference plane and the horizontal plane.

FIG. 15A is a cross-sectional view of another embodiment of the laser diode module 199. In this embodiment, the laser diode module 199 includes an outer casing 200 preferable made from a rigid metal such as brass. As shown a hole 201 is machined in the left side of the outer casing 200. The hole 201 includes a threaded section 204 which extends from the left outer edge of the outer casing 200 towards the central portion of the outer casing 200. A lens 206 is pressed into a cylindrical lens mount 208. A suitable lens is part no. M23,021 available from Edmund Scientific Company of Barrington, N.J. A suitable cylindrical lens mount 208 can be fabricated out of injection molded ABS plastic. The cylindrical lens mount 208 preferably includes threads on the outer surface that mate with the threaded section 204 of the hole 201. The lens mount 208 holding the lens 206 is screwed into the threaded section 204. A second hole 205 is machined into the outer casing 200. The second hole 205 is concentric with the first hole 201. The diameter of the second hole 205 matches the diameter of a laser diode 209. A suitable laser diode 209 is part no. HL6714G made by Hitachi America, Ltd. of Brisbane, Calif. The second hole 205 preferable fits the laser diode 209 very snugly so as to promote thermal conduction to dissipate the heat generated by the laser diode 209 during normal operation. A third hole 207 is machined into the right side of the outer casing 200 and is concentric to the second hole 205. The second hole 205 connects the holes 201 and 207. The laser diode 209 is mounted to a spacer 212 and is soldered to a printed circuit board (PCB) 211. Also on the PCB 211 is a power supply circuit 214 to drive the laser diode 209. A suitable spacer 212 is preferably fabricated out of plastic. A suitable power supply circuit 214 is the power circuit shown on page 35 of application note 465-5445 from Toshiba America Electronics Corporation of Sunnyvale, Calif. The positive terminal of the power supply circuit 214 is wired to the outer casing 200. The ground of the power supply circuit 214 is wired to a solder point 213 on a connector board 216. When assembled, the solder point 213 is aligned with the mechanical axis of the outer casing 200. A suitable material for the connector board 216 is a conventional PCB material. Insulation is applied to the inside of the hole 207 so as to fix in place: the laser diode 209, the spacer 212, the PCB 211, and the connector board 216. A suitable insulation material is Plasti-Dip made by PDI of Circle Pines, Minn.

When fully assembled, a positive voltage, for example 4.5 V, is applied to the outer casing 200 and ground is applied to solder point 213 causing the laser diode 209 to lase. At this point the lens mount 208 containing the lens 206 is screwed along threaded section 204 until the laser focuses to a 5–10 mm spot on a target approximately 5 meters away. The exact spot size and distance are not critical. An outer shoulder 202 is machined along the left edge of the outer casing 200. The shoulder 202 surrounds the outer casing 200 and is centered about its mechanical axis. Although the shoulder 202 is shown in FIG. 15A on the left side, the shoulder 202 can be anywhere along the length of the outer casing 200.

Figure 15C:
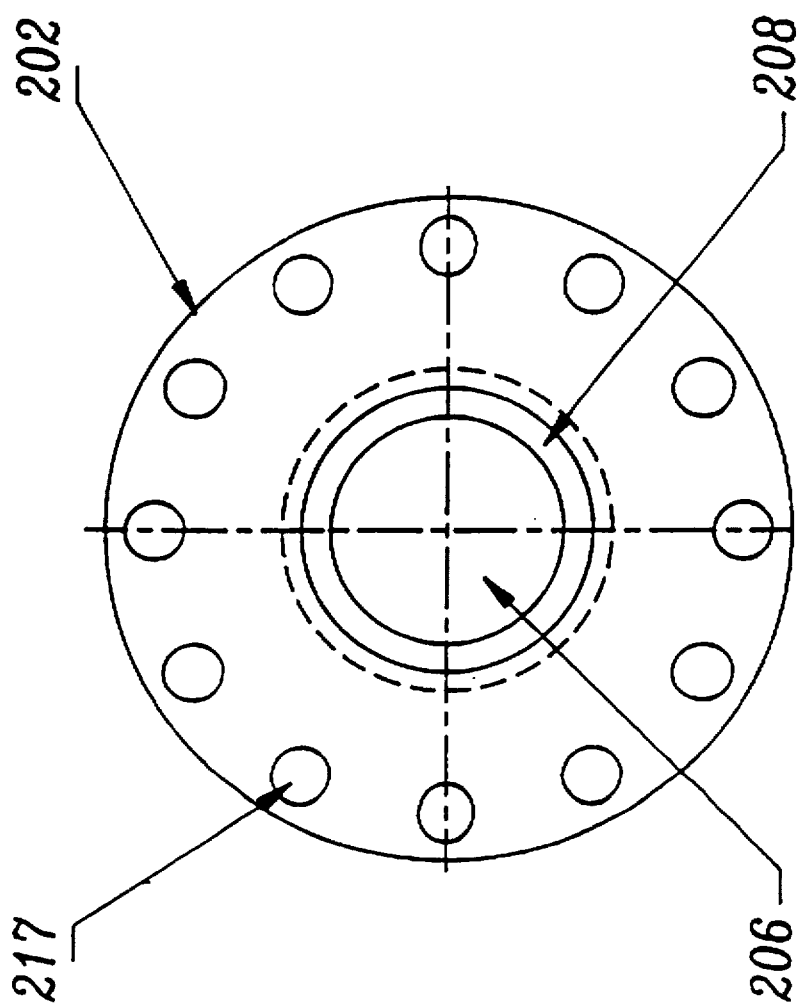
FIG. 15C illustrates the location of the holes along the perimeter of the shoulder of the laser diode module.

FIG. 15B is a view of the laser diode module 199 taken along the line J—J. A set of ridges 215 are machined along the edge of the outer shoulder 202. The exact number of ridges 215 around the shoulder 202 is not important. In still another embodiment shown in FIG. 15C, the shoulder 202 has a number of holes 217 along the perimeter of the shoulder 202. Referring to FIG. 7, the laser diode 199 is inserted into the cylindrical hole 38. The shoulder 202 stops the laser diode 199 from sliding through the cylindrical hole 38. The ridges 215 or holes 217 can be used to rotate the laser diode module 199 around the mechanical axis of the cylindrical hole 38. Thus the laser diode module 199 is extremely conducive to the alignment method described earlier, for example, at pages 9–11.

Figures 16A, 16B:
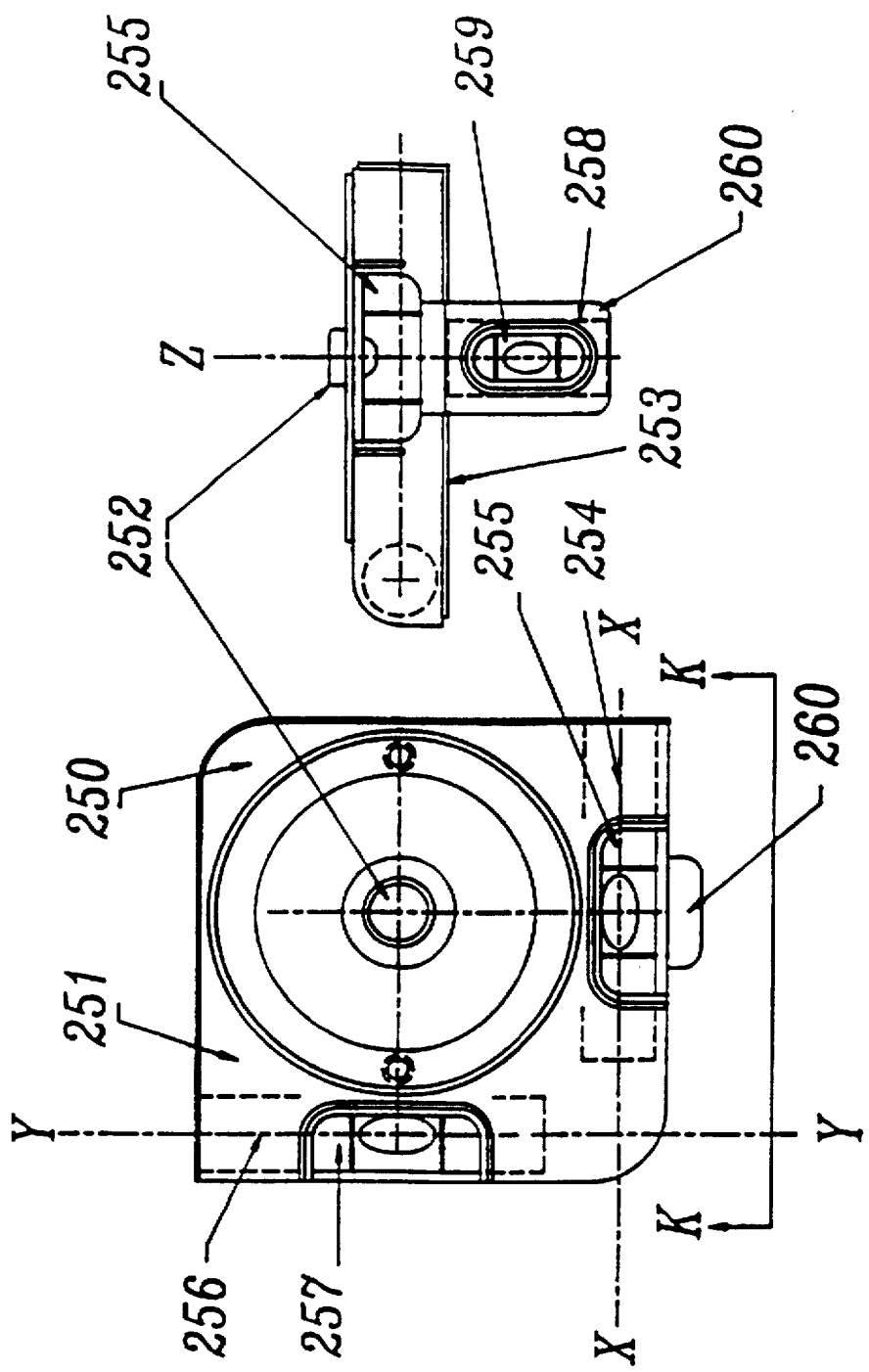
FIG. 16A is a top view of an integral upper plate for aligning vials with respect to a rotating shaft.
FIG. 16B is a front view of an upper plate taken along line K—K.

FIG. 16A is a top view of an integral upper plate for aligning a set of spirit vials with respect to a rotating shaft. An upper plate 250 is preferably machined out of a rigid material such as aluminum or die cast aluminum alloy 383. A hole 252 is machined perpendicular to the top surface 251 of the upper plate 250. Referring to FIG. 16B, a front view of the upper plate 250 taken along line K—K, and FIG. 8, the bottom surface 253 of the upper plate 250 is preferably attached to the top surface 9 of the upper case 2. Referring to FIGS. 16A and 8, the hole 252 is machined to be the same diameter and concentric to the circular orifice 5. As before in FIG. 8, the hole 252 shown in FIG. 16B will determine a Z-axis of rotation. As shown in FIGS. 16A–B, two holes 254, 256 are machined to be perpendicular to the hole 252.

The mechanical axis of the hole 256 determines a Y-axis which is perpendicular to the Z-axis of rotation. The mechanical axis of the hole 254 determines an X-axis which is also perpendicular to the Z-axis of rotation. Two cylindrical spirit vials 255, 257 are inserted into the holes 254, 256, respectively. A suitable vial is part no. 0349 made by Empire Level Mfg. Corp. of Milwaukee, Wis. Referring to FIG. 16B, the upper plate 250 includes an arm 260 which includes a machined hole 258. The hole 258 is offset and parallel to the hole 252. A cylindrical spirit vial 259 is inserted into the hole 252. A suitable vial 259 is part no. 0224 made by Empire Level Mfg. Corp. of Milwaukee, Wis.

In the horizontal orientation illustrated in FIG. 8, if the vials 255, 257 are leveled the laser level 1 will project a level horizontal plane of laser light. In the vertical and plumb orientation illustrated in FIGS. 13A and 13B, if the vial 258 is leveled then the laser level 1 will project a vertical plane of laser light that is perpendicular to a level horizontal plane. The upper plate 250 eliminates the need to machine the top surface 3 to be perpendicular to the circular orifice 5 as shown in FIG. 8. It also eliminates the need to machine the bottom and top surfaces of the caps 76 and 78 to be flat and parallel as shown in FIGS. 10–11.

Figure 18:
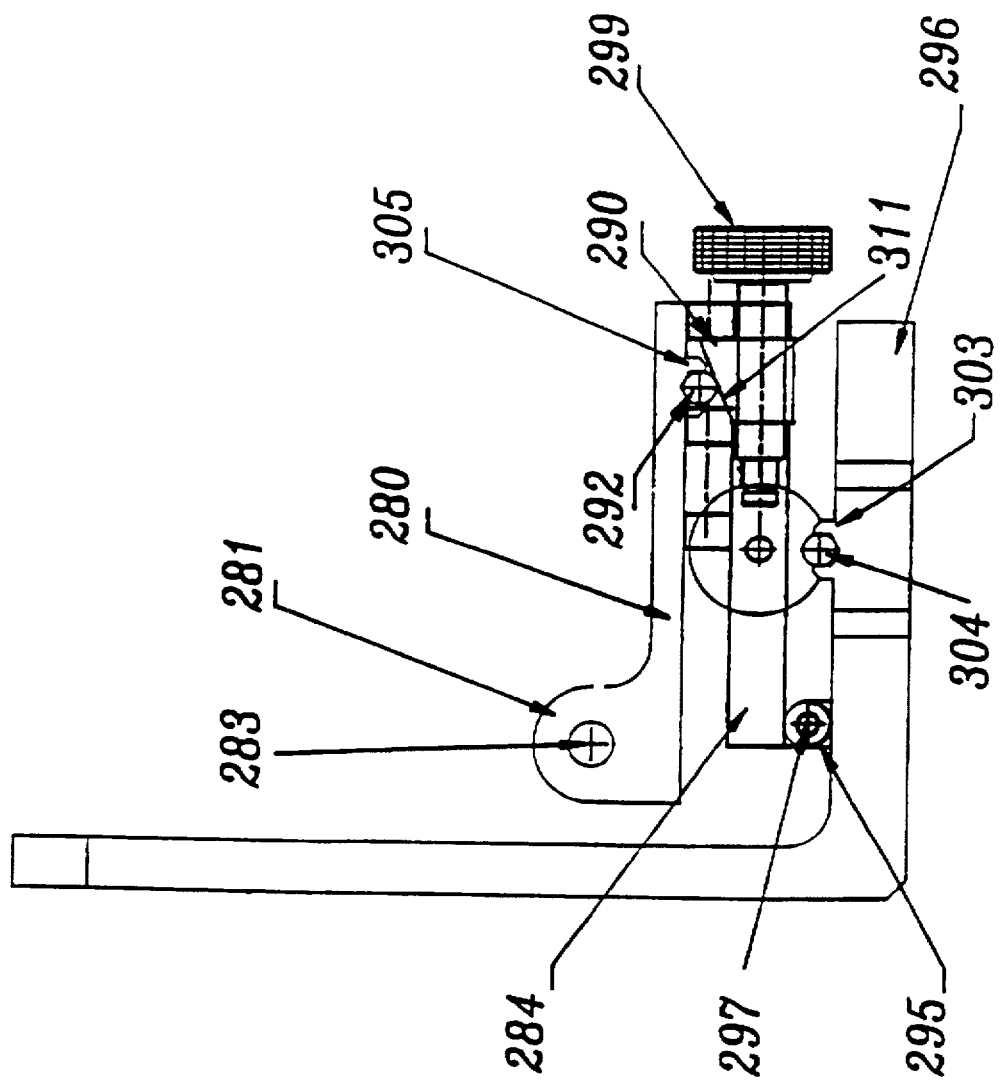
FIG. 18 is a cross-sectional view of a leveling system.

In an alternate embodiment of the invention, FIG. 18 illustrates a cross-sectional view of a leveling system. The leveling system consists of three major components: a bottom plate 280, a leveling plate 284, and a base plate 296. All three components are preferably machined from a rigid material such as aluminum. A suitable alternative material is injected molded polypropylene plastic. The bottom plate 280 includes a locating bracket 281 integrally extending from the top left side of the bottom plate 280. A locating hole 283 is machined into the locating bracket 281.

Figure 20:
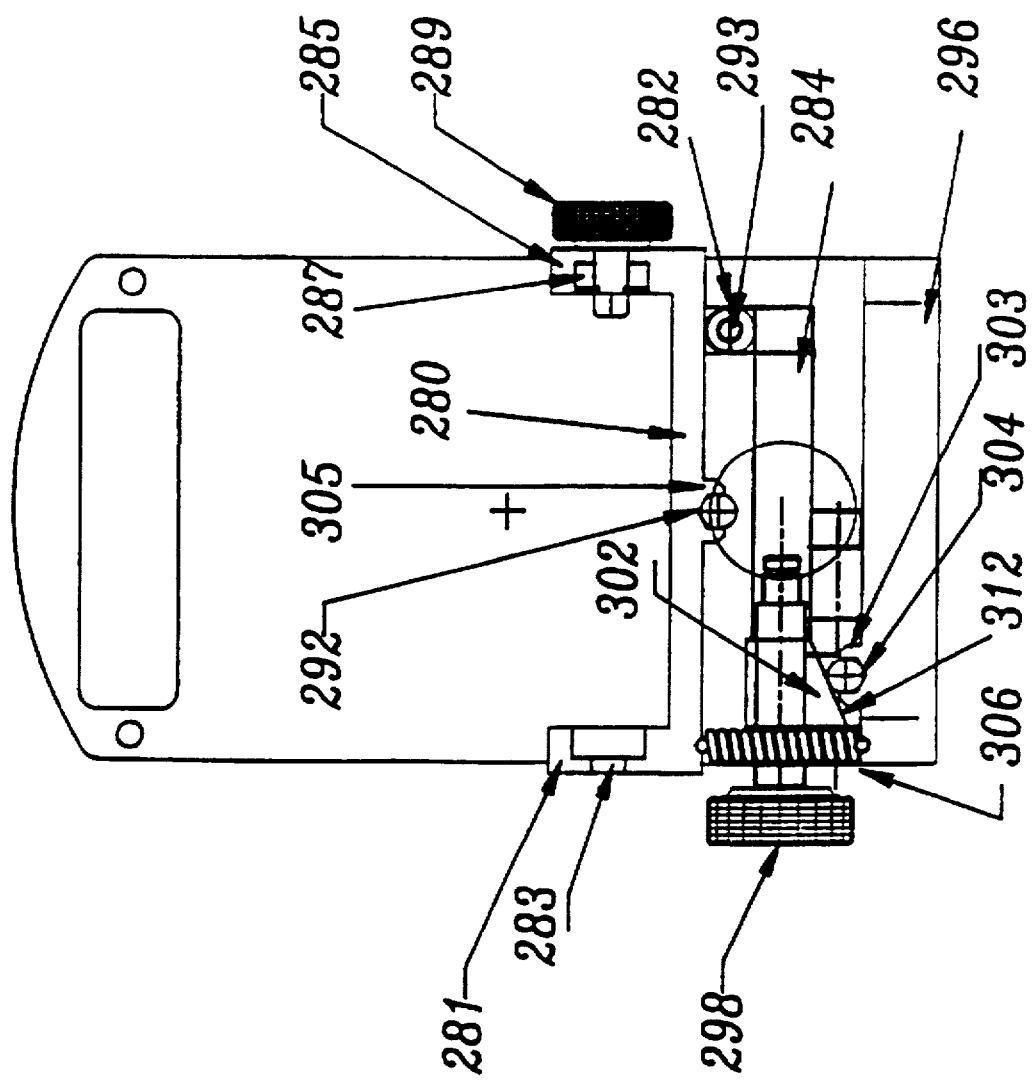
FIG. 20 is a front view of the leveling system.

FIG. 20, a front view of the leveling system, shows a corresponding locating bracket 285 and a locating hole 287 on the right side of the bottom plate 280. The locating brackets 281, 285, and locating holes 283, 287, are used to locate the lower case 4 as shown in FIG. 8 on the bottom plate 280. The distance between the inside of the locating brackets 281, 285, corresponds to the width of the lower case 4. Two holes (not shown) are machined and threaded in the lower case 4 so that they are concentric to the locating holes 283, 287, when the lower case 4 is placed on the bottom plate 280. A thumb screw 289 and a corresponding thumb screw (not shown) is used to lock the lower case 4 to the bottom plate 280. A suitable thumb screw is part no. 9T41-B8399116 made by Stock Drive Products of New Hyde Park, N.Y. A half hinge 282 integrally extends along the right bottom edge of the bottom plate 280.

Figure 19:
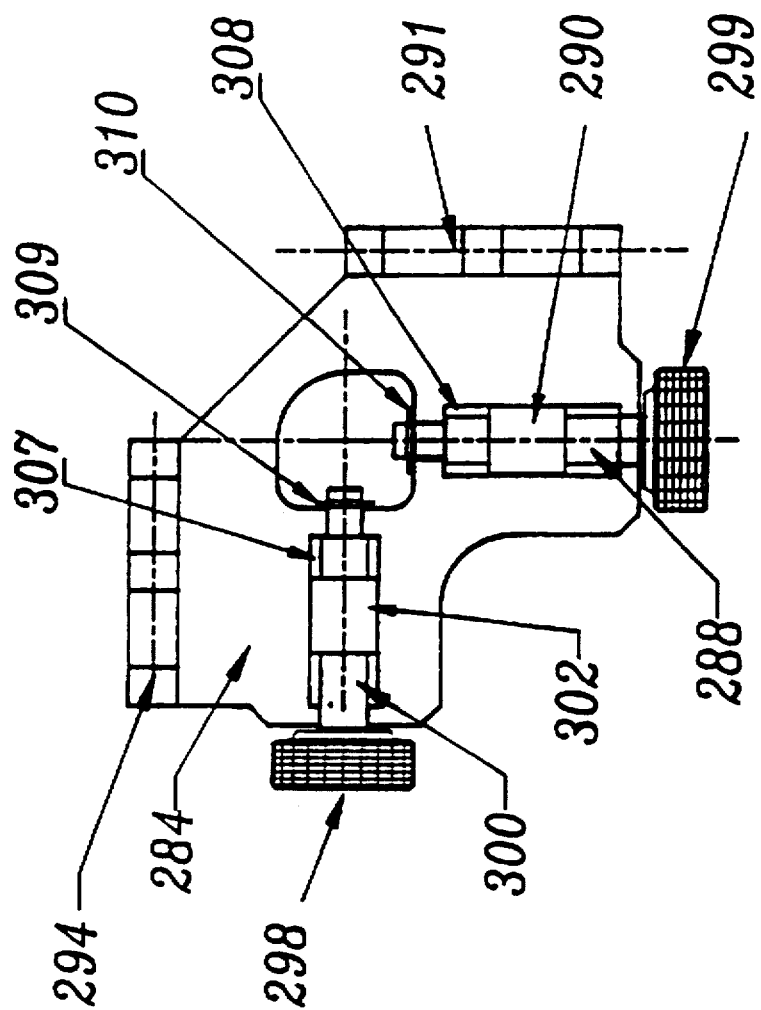
FIG. 19 is a top view of a leveling plate.

FIG. 19 is a top view of the leveling plate 284, including a matching half hinge 291 extending from the right top edge of the leveling plate 284. Referring to FIGS. 19 and 20, a pin 293 couples together the half hinges 282 and 291. A suitable pin 293 is part no. A9Y35-0444 made by Stock Drive Products of New Hyde Park, N.Y. The half hinges 282, 291, are machined and assembled so that the bottom plate 280 pivots around the pin 293. An U-shaped or circular-shaped mitt 305 integrally extends from the bottom, front, center of the bottom plate 280 as shown in FIG. 20. A steel ball 292 of slightly larger diameter than the inner opening of the mitt 305 is press fit into the mitt 305. A suitable steel ball is part no. A9Y71-06 made by Stock Drive Products of New Hyde Park, N.Y. Attached to the bottom left corner of the bottom plate 280 is one end of a biasing spring 306. A suitable spring is part no. S78ESY-006008025 made by Stock Drive Products of New Hyde Park, N.Y. The other end of the spring is attached to the top left corner of the base plate 296.

FIG. 19 is a top view of the leveling plate 284, including two holes 307, 308, which are machined into the left center and front center of the leveling plate 284, respectively. The holes 307, 308 are perpendicular to each other. Thumb screws 298, 299 are inserted respectively into the holes 307, 308. A suitable thumb screw is part no. 9T41-R8399134 made by Stock Drive Products of New Hyde Park, N.Y. The thumb screws 298, 299 can be held in place using retainer rings 309, 310, respectively. A suitable retainer ring is part no. A9Q290-15 made by Stock Drive Products of New Hyde Park, N.Y. Two adjustment blocks 290, 302 are threaded onto respectively the thumb screws 299, 298. The width of the blocks 290, 302 fit within the holes 308, 307, respectively. Suitable adjustment blocks 290, 302 are preferably machined out of brass and then nickel plated. As shown in FIGS. 18–20, the adjustment blocks 290, 302, each include an inclined surface 311, 312, respectively. As shown in FIG. 20, the inclined surface 312 of adjustment block 302 contacts the ball 304. As shown in FIG. 18, the inclined surface 311 contacts the ball 292. The adjustment blocks 290, 302 include threads matching the threads of the thumb screws 299, 298. As the thumb screws 298, 299 are rotated the adjustment blocks 302, 290 move along the length of the holes 307, 308. A half hinge 294 integrally extends from the bottom, left rear corner of the leveling plate 284.

Referring to FIG. 18, a matching half hinge 295 integrally extends from the top left side of the base plate 296. A pin 297 couples together the two half hinges 294 and 295. A suitable pin 297 is part no. A9Y35-0444 made by Stock Drive Products of New Hyde Park, N.Y. The half hinges 294, 295 are machined and assembled so the leveling plate 284 pivots around the pin 297. An U-shaped or circular shaped mitt 303 integrally extends from the top center of the base plate 296. A steel ball 304 is press fit into the mitt 303 as described earlier. A suitable steel ball 304 is part no. A9Y71-06 made by Stock Drive products of New Hyde Park, N.Y.

When the leveling system is assembled, the bottom plate 280 rests above the leveling plate 284, which in turn rests above the base plate 296. The steel ball 292 is coupled tightly to the adjustable block 290 due to the tension of the spring 306 (FIG. 20). As the thumb screw 299 is rotated counter-clockwise the adjustment block 290 will move to the left. Because of the inclined surface 311 of the adjustment block 290, the bottom plate 280 will pivot about the pin 293. FIG. 18 is one orientation of the block 290 such that a counter-clockwise rotation of the thumb screw 299 will raise the bottom plate 280 about the pin 293. Rotating the adjustment block 290, 180 degrees will cause a counter-clockwise rotation of the thumb screw 299 to lower the bottom plate 280 about the pin 293.

Referring to FIG. 20, the steel ball 304 is coupled tightly to the adjustable block 302 due to the tension of the spring 306. As the thumb screw 298 is rotated counter-clockwise the adjustment block 302 will move to the right. Because of the lower inclined surface 312 of the adjustment block 302, the leveling plate 284 will pivot about the pin 297 as shown in FIG. 18. FIG. 20 illustrates an orientation of the block 302 such that a counter-clockwise rotation of the thumb screw 298 will raise the leveling plate 284 about the pin 297 (FIG. 18). Rotating the adjustment block 302, 180 degrees will cause the counter-clockwise rotation of the thumb screw 298 to lower the leveling plate 284 about the pin 297 (FIG. 18).

Figures 17A, 17B, 17C:
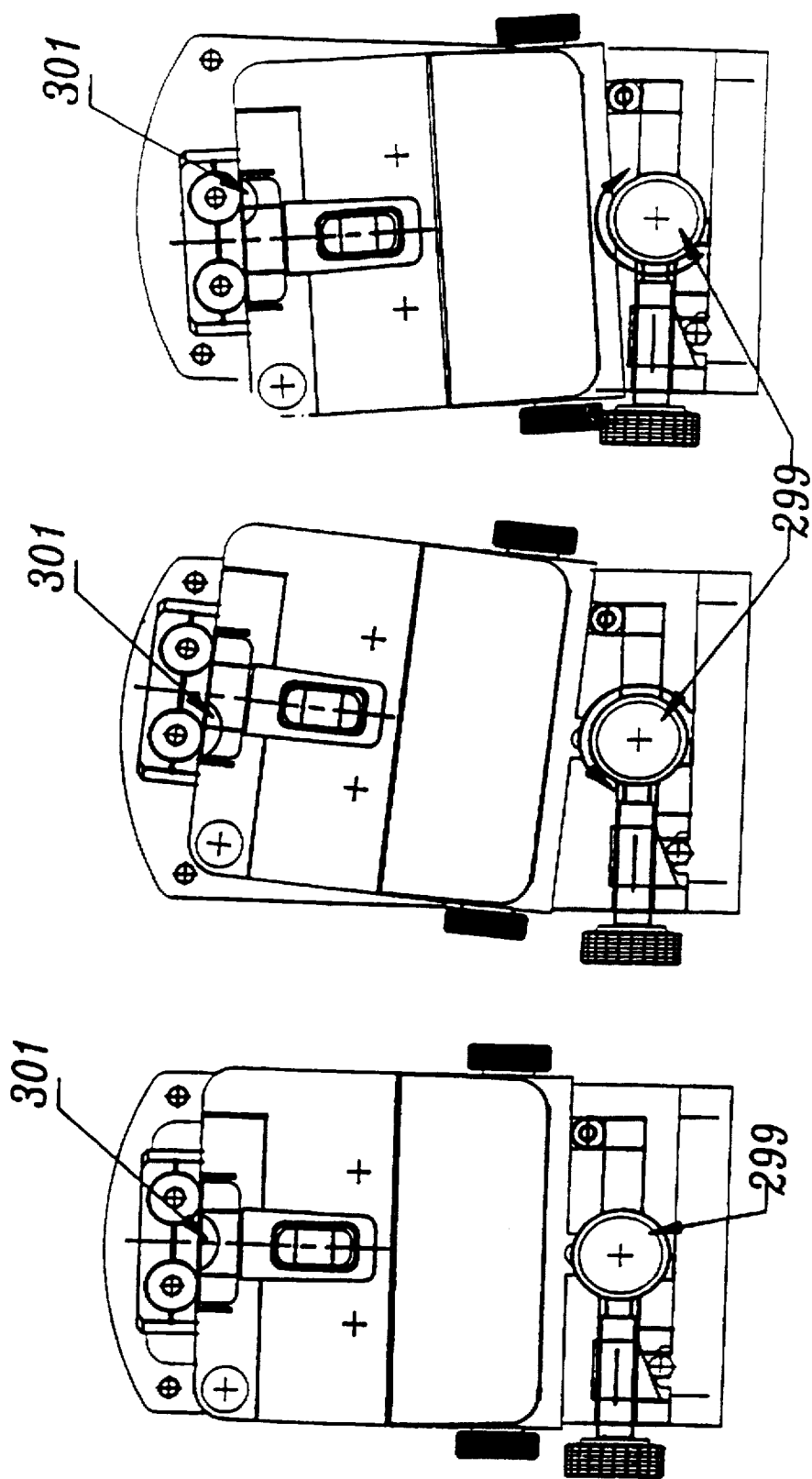
FIGS. 17A–C illustrate a preferred embodiment of the invention where rotation of a thumb screw causes the spirit vial bubble to move.

FIGS. 17A–C illustrate a preferred embodiment of the invention where the adjustment block 290 is oriented such that a counter-clockwise rotation of the thumb screw 299 causes a bubble 301 to move to the left and a clockwise rotation of the thumb screw 299 causes the bubble 301 to move to the right. Thus, the user can intuitively adjust the laser level 1 for operation.

What is claimed:

1. A method of aligning a laser diode module, comprising:

providing an alignment station with an alignment hole which is perpendicular to the earth;

providing a module housing, including:
 a cylindrical hole with a center axis, and
 a main shaft which is perpendicular to the center axis;

providing a laser diode module that generates coherent light;

extending the main shaft into the alignment hole so that the main shaft is normal to the surface of the earth and defines a Z-axis of rotation;

defining an horizontal axis H which intersects and is perpendicular to the Z-axis of rotation and the center axis;

inserting the laser diode module into the cylindrical hole of the module housing, wherein the laser diode module is rotatable within the cylindrical hole;

spacing the alignment station from a vertical wall;

providing an alignment target on the vertical wall, wherein the alignment target includes a vertical reference line and a horizontal reference line, wherein the vertical reference line is normal to the earth and the horizontal reference line is perpendicular to the vertical reference line;

aligning the alignment station and the alignment target so that the horizontal reference line and the horizontal axis H are parallel to one another and in the same horizontal plane with respect to the earth;

powering the laser diode module so that a laser beam strikes the alignment target and causes a laser beam spot to appear on the target; and rotating the laser diode module in the cylindrical hole of the module housing until the laser beam is centered along the horizontal reference line of the alignment target.

2. A method of making a laser system, comprising:

providing a module housing, including:
 providing a cylindrical hole with a center axis, and
 providing a main shaft defining an axis of rotation which is perpendicular to the center axis;

providing a case with a bearing to support the main shaft;

inserting the main shaft into the bearing;

providing a motor;

coupling the motor to the main shaft;

providing a rotatable laser diode module which generates coherent light;

inserting the rotatable laser diode module into the cylindrical hole in the module housing;

powering the rotatable laser diode module so that the rotatable laser module projects a laser beam along a center ray;

rotating the rotatable laser diode module until the center ray of the laser beam and the center axis define an angle θ, wherein the angle θ lies within a plane which is perpendicular to the axis of rotation of the main shaft.

3. A laser system, comprising:

a module housing, including:
 main shaft defining an axis of rotation, and
 a cylindrical hole with a center axis which lies in a plane perpendicular to the axis of rotation;

a case with a bearing to support the main shaft, wherein the main shaft is in the bearing;

a motor, wherein the motor is coupled to the main shaft; and a rotatable laser diode module which generates coherent light, wherein the rotatable laser diode module is in the cylindrical hole of the module housing, wherein the rotatable laser diode module projects a laser beam along a center ray, wherein the center ray of the laser beam and the center axis define an angle θ, and wherein the angle θ lies within the plane which is perpendicular to the axis of rotation of the main shaft.

4. A laser system, comprising:

a module housing, including:
 a first cylindrical hole with a first center axis, and
 a second cylindrical hole with a second center axis, wherein the first and second center axis define a plane;

a main shaft defining an axis of rotation, wherein the axis of rotation is perpendicular to the plane;

a case with a bearing to support the main shaft, wherein the main shaft is in the bearing;

a motor, wherein the motor is coupled to the main shaft;

a first rotatable laser diode module which generates coherent light, wherein the first rotatable laser diode module is in the first cylindrical hole of the module housing, wherein the first rotatable laser diode module projects a first laser beam along a first center ray, wherein the first center ray of the first laser beam and the first center axis define a first angle θ, and wherein the first angle θ lies within the plane; and a second rotatable laser diode module which generates coherent light, wherein the second rotatable laser diode module is in the second cylindrical hole of the module housing, wherein the second rotatable laser diode module projects a second laser beam along a second center ray, wherein the second center ray of the second laser beam and the second center axis define a second angle θ, and wherein the second angle θ lies within the plane.

5. The laser system of claim 3 or 4, further comprising an upper plate, secured to the case, including a first vial and a second vial, wherein the upper plate defines a shaft hole, a first vial hole, and a second vial hole, wherein the shaft hole is concentric with the Z-axis of rotation, the first vial hole defines a X-axis, and the second vial hole defines a Y-axis, and wherein the X- and Y-axis define a reference plane perpendicular to the Z-axis of rotation and the first vial hole houses the first vial and the second vial hole houses the second vial.

6. The laser system of claim 3 or 4, further comprising an upper plate secured to the case, wherein the upper plate defines a shaft hole concentric with the main shaft and a vial hole parallel to the shaft hole, wherein the vial hole houses a vial.

7. The laser system of claim 3 or 4, further comprising a bearing around the main shaft, a main pulley around the bearing, a free wheel attached to the main shaft and adjacent to the main pulley, wherein the main pulley and the free wheel each include at least one spaced apart magnet and the main pulley is coupled to the motor.

8. The laser system of claim 3 or 4, further comprising a rotatable cap having an opening and resting on the case, wherein the cap is coupled to the module housing and at least one laser beam is projected through the opening.

9. The laser system of claim 3 or 4, further comprising an upper plate secured to the case, a rotatable cap having an opening and resting on the upper plate, wherein the cap is coupled to the module housing and the laser beam is projected through the opening.

10. The laser system of claim 3 or 4, further comprising a rotatable cap having an opening, resting on the case, wherein at least one laser beam is projected through the opening, wherein the rotatable cap includes a spacing contact attached to the inner wall of the cap and impeding the rotation of the module housing.

11. The laser system of claim 3 or 4, further comprising an upper plate secured to the case, a rotatable cap having an opening and resting on the upper plate, wherein at least one laser beam is projected through the opening wherein the rotatable cap includes a spacing contact attached to the inner wall of the cap and impeding the rotation of the module housing.

12. The laser system of claim 2 or 3, further comprising a cross-hair accessory on the case, the accessory including a first mirror aligned to reflect the projected laser beam from a first direction perpendicular to the main shaft to a second direction parallel to the main shaft.

13. The laser system of claim 12, wherein the first direction is a rotating horizontal beam.

14. The laser system of claim 12, wherein the first direction is a rotating vertical beam.

15. The laser system of claim 12, wherein a plurality of cross-hair accessories are supported on the case.

16. The laser system of claim 3 or 4, further comprising an upper plate secured to the upper case, a cross-hair accessory secured to the upper plate, the accessory including a first mirror aligned to reflect the projected laser beam from a first direction perpendicular to the main shaft to a second direction parallel to the main shaft.

17. The laser system of claim 16, wherein the first direction is a rotating horizontal beam and the third direction is a vertical line perpendicular with respect to the horizontal beam.

18. The laser system of claim 16, wherein the first direction is a rotating vertical beam and the third direction is a horizontal line perpendicular with respect to the vertical beam.

19. The laser system of claim 16, wherein a plurality of cross-hair accessories are supported on the upper plate.

20. The laser system of claim 3 or 4, wherein the laser diode module includes:

an outer casing with a shoulder;

a lens;

a power supply;

a laser diode; and wherein the outer casing houses the laser diode, the lens, and the power supply.

21. The laser diode module of claim 20, wherein the shoulder of the outer casing includes an outer edge with at least one ridge.

22. The laser diode module of claim 20, wherein the shoulder of the outer casing includes at least one hole.

23. A laser system, comprising:

a module housing, including:
   a module hole, and
   a main shaft defining a Z-axis of rotation;

a case with a bearing to support the main shaft, wherein the main shaft is in the bearing;

a motor, wherein the motor is coupled to the main shaft;

a laser diode module which generates coherent light, wherein the laser diode module is in the module hole, and wherein the laser diode module projects a laser beam along a center ray within a plane which is perpendicular to the axis of rotation of the main shaft;

an upper plate, secured to the case, including a first vial and a second vial, wherein the upper plate defines a shaft hole, a first vial hole, and a second vial hole, wherein the shaft hole is concentric with the Z-axis of rotation, the first vial hole defines a X-axis, and the second vial hole defines a Y-axis, and wherein the X- and Y-axis define a reference plane perpendicular to the Z-axis of rotation and the first vial hole houses the first vial and the second vial hole houses the second vial.

* * * * *